Aug. 28, 1934.  H. A. S. HOWARTH  1,971,412
BEARING
Filed Aug. 11, 1931   12 Sheets-Sheet 1

Aug. 28, 1934.  H. A. S. HOWARTH  1,971,412
BEARING
Filed Aug. 11, 1931      12 Sheets-Sheet 2

Inventor
Harry A. S. Howarth.
By Cameron, Kerkam & Sutton
Attorneys

Aug. 28, 1934.                H. A. S. HOWARTH                1,971,412
                                  BEARING
                          Filed Aug. 11, 1931          12 Sheets-Sheet 3

Inventor
Harry A. S. Howarth
By Cameron, Kerkam & Sutton
Attorneys

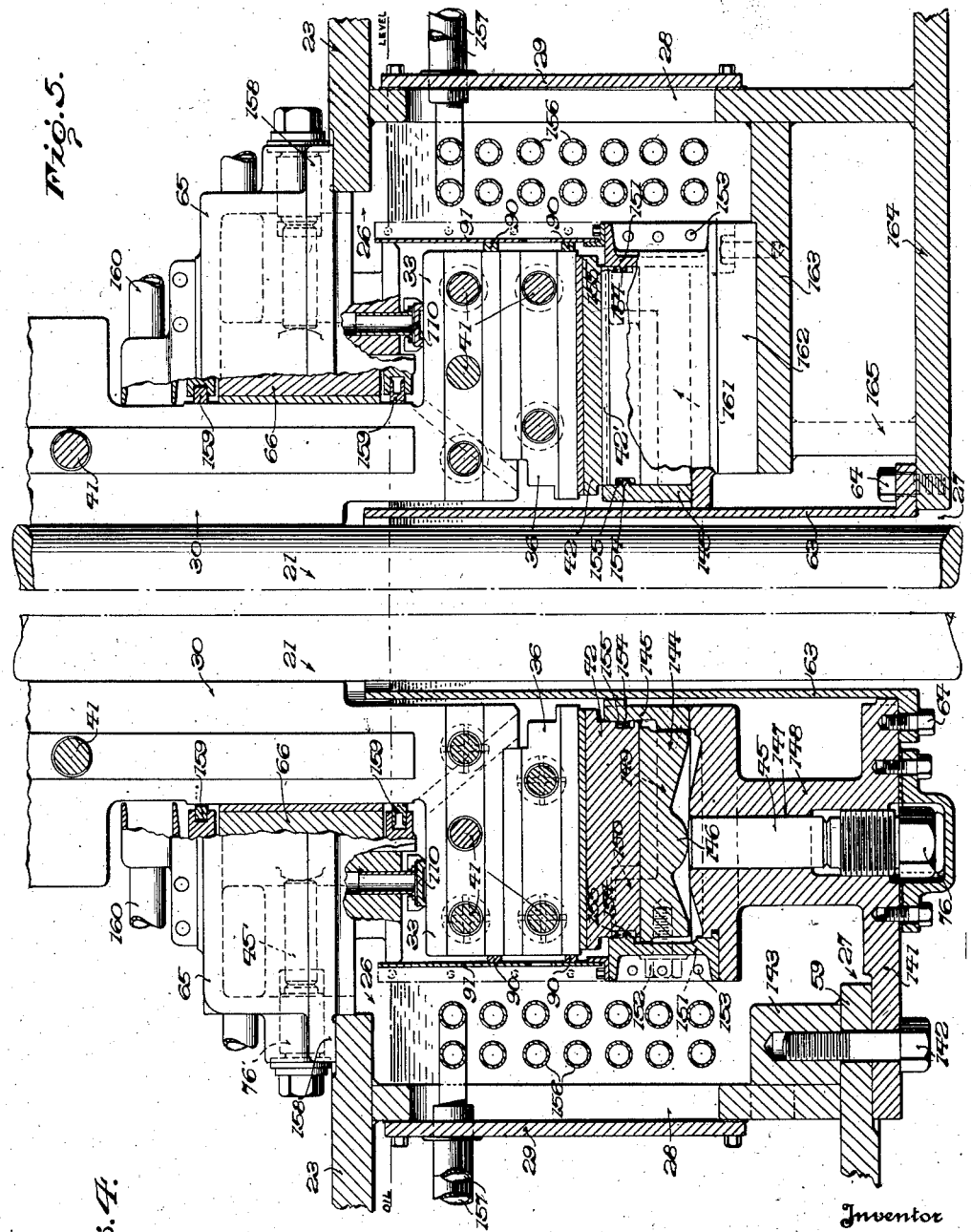

Aug. 28, 1934.   H. A. S. HOWARTH   1,971,412
BEARING
Filed Aug. 11, 1931   12 Sheets-Sheet 5

Inventor
Harry A. S. Howarth
By Cameron, Kerkam & Sutton
Attorneys

Aug. 28, 1934.   H. A. S. HOWARTH   1,971,412
BEARING
Filed Aug. 11, 1931    12 Sheets-Sheet 6

Inventor
Harry A. S. Howarth.
By Cameron, Kerkam & Sutton
Attorneys

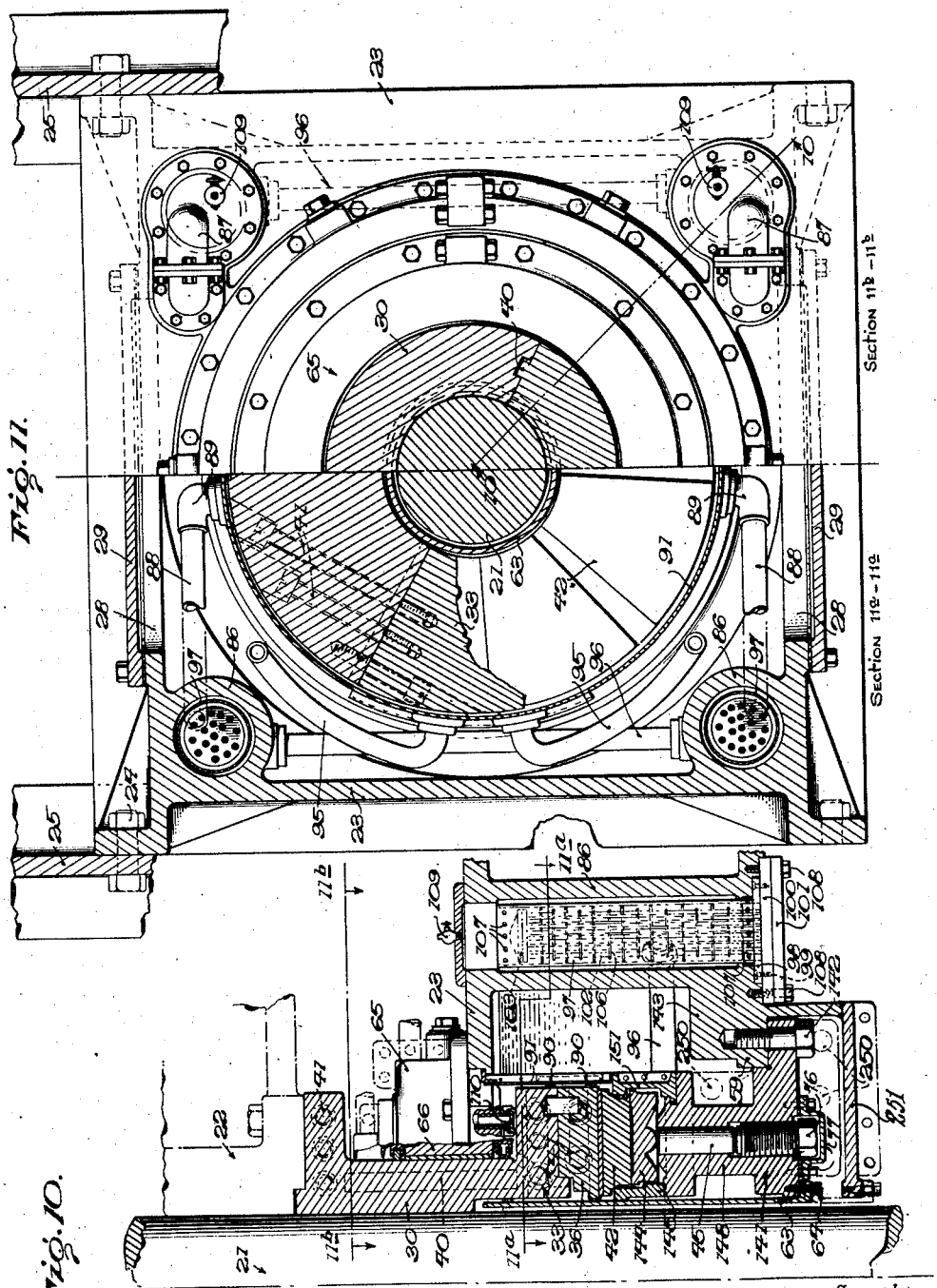

Inventor
Harry A. S. Howarth.

By Cameron, Kerkam & Sutton.
Attorneys

Aug. 28, 1934.  H. A. S. HOWARTH  1,971,412
BEARING
Filed Aug. 11, 1931   12 Sheets-Sheet 9

Inventor
By Harry A. S. Howarth.
Cameron, Kerkam & Sutton.
Attorneys.

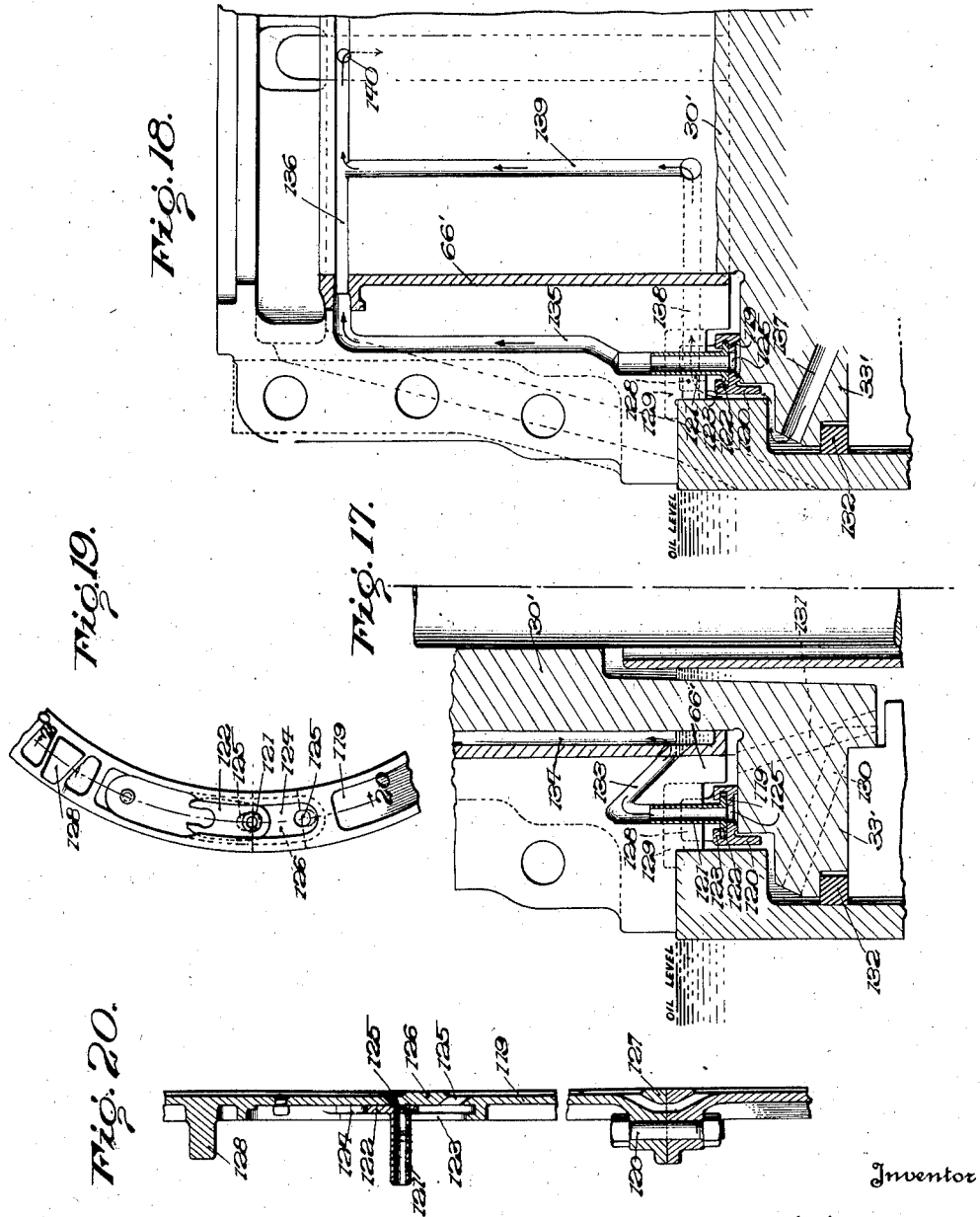

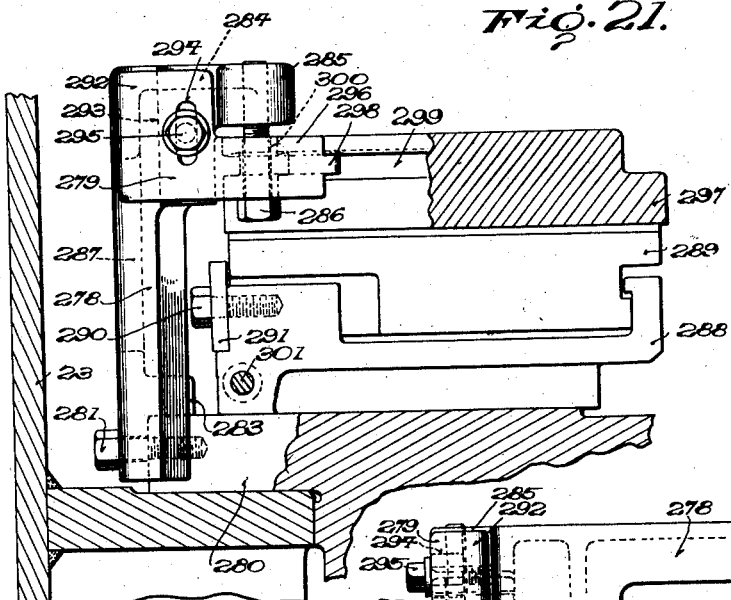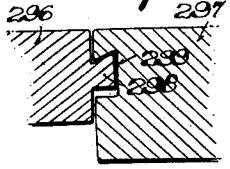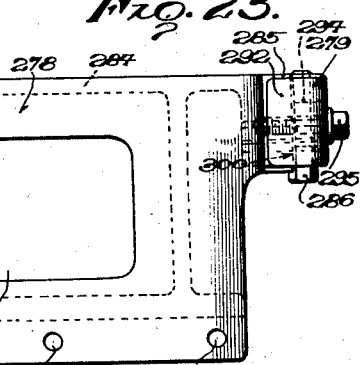

Patented Aug. 28, 1934

1,971,412

UNITED STATES PATENT OFFICE 1,971,412

BEARING

Harry A. S. Howarth, Frankford, Pa., assignor to Kingsbury Machine Works, Inc., Philadelphia, Pa., a corporation of Delaware Application August 11, 1931, Serial No. 556,440

108 Claims. (Cl. 308—160)

This invention relates to bearings, and particularly to thrust bearings or combined thrust and radial bearings for vertical shafts.

Large hydroelectric units, motors, centrifugal pumps and other machinery mounted to rotate about vertical axes are frequently constructed with the rotor located at the upper end of the shaft, the lower portion of the shaft extending downwardly through the floor or supporting structure, as to a source of driving energy. In installations of this character a thrust bearing must be provided to carry the weight of the rotor and is generally situated below said rotor, while between the thrust bearing and rotor a guide or journal bearing, which will be referred to herein as a radial bearing, is frequently interposed to steady the shaft in its vertical line. The thrust bearing is desirably housed in a pot or well formed between the girders or beams constituting the supporting structure for the machinery, and it is highly desirable that the several component elements of these bearings be readily accessible when in operative position for adjustment, inspection and repair as well as to facilitate assembly and disassembly.

It is sometimes desirable that bearings of this character be capable of being lowered or raised as a unit into place through the openings in the girders forming the shaftway. It is also desirable in some instances that it be possible to lift the shaft a substantial distance without danger to the bearing parts, and as it may be undesirable to separate the thrust bearing surfaces or to slide journal bearing surfaces during such a movement, it is sometimes advantageous to have the bearing structure made supportable as a unit from a liftable member associated with the shaft.

These and other considerations, including the fact that in installations of this kind the bearings and the supporting structure are usually furnished by different manufacturers, render desirable a bearing construction which is characterized by the unity and compactness of its structure and by a high degree of accessibility for purposes of inspection, adjustment, removal and repair as well as by a stiffness and rigidity of support that will assure against harmful deflection and binding at the bearing parts.

It is therefore one of the objects of the present invention to provide a novel thrust bearing, or combined thrust and radial bearing, which is readily accessible while in place for purposes of inspection, adjustment or removal of the parts.

Another object is to provide an improved thrust bearing, or combined thrust and radial bearing, for vertical shafts which is readily accessible from above or below or from the side for assembly, inspection or removal of the parts.

Another object of this invention is to provide a novel thrust bearing, or combined thrust and radial bearing, for vertical shafts wherein adjustment of the bearing elements may be readily effected from below the pot or supporting structure.

A further object is to provide a thrust bearing, or combined thrust and radial bearing, for vertical shafts of novel, compact construction which may be raised or lowered into place with or relatively to the shaft as a unit, and is yet accessible when in place for removal of the parts individually or in groups for inspection, replacement or repair.

Still another object is to provide a bearing of the character described which embodies novel means whereby the thrust or radial bearing elements, or both, may be raised as a unit with the shaft so as to permit lifting of the shaft without separation of the thrust bearing surfaces, or sliding of journal bearing surfaces.

A still further object is to provide a novel thrust bearing for vertical shafts wherein the parts of the bearing are easily accessible from the side for inspection and adjustment, and the shoes and runner, and associated parts, may be severally removed through the side walls of the supporting structure or pot for inspection, replacement or repair.

Another object is to provide a thrust bearing, or combined thrust and radial bearing, for vertical shafts of compact and unitary structure which is adapted to be housed in a pot or well of maximum strength which may be formed as a unit separate from the supporting girders or beams to which it is secured.

Another object is to provide a bearing of the type described which embodies a deep, stiff thrust base structure for preventing deflection of the bearing elements under heavy loads.

Another object is to provide a vertical thrust bearing wherein novel means are provided whereby the shoes may be removed radially of the bearing for inspection, replacement or repair, said shoes being mounted in a cage and removable either individually or in groups.

Another object is to provide a bearing of the character described embodying novel means for operatively connecting the thrust block, runner and shoes so that they may be lifted as a unit, said means also permitting the thrust block and runner to be lifted independently of the shoes.

Another object is to provide a novel combined thrust and radial bearing wherein the radial bearing is adjustable and the means for its adjustment is readily accessible.

Another object is to provide a bearing of the type just characterized wherein the means for adjusting the radial bearing is carried by the thrust base ring whether the radial bearing is above or below the thrust bearing.

Another object is to provide a thrust bearing for a flanged shaft that is so constructed that the shaft with its flange may be readily withdrawn from the pot, with the bearing parts carried thereby if desired, without dismantling the thrust base and associated parts.

Another object is to provide a thrust bearing construction which may be standardized for use with either spherical or plane bearing members and for use with different forms of pressure equalizing devices.

Another object is to provide a thrust bearing having jackscrews accessible from below the bearing pot for adjustment purposes.

Another object is to provide a vertical thrust bearing in which the bearing shoes are supported in a cage made in halves so that both the cage sections and the shoes carried thereby may be removed radially of the bearing through openings in the sides of the bearing pot or supporting structure.

Another object is to provide a novel lubricating system for a thrust bearing, or a combined thrust and radial bearing, preferably embodying oil cooler units insertable from above or below into the oil well, wherein a reversible oil circulation through the coolers is maintained by a viscosity pump cooperating with the periphery of the bearing runner or thrust block.

Another object is to provide a thrust bearing, or combined thrust and radial bearing, for vertical shafts with a cooling system for the oil which is simple in construction and which occupies little space so that it can be installed within an oil pot that occupies little space in addition to that required for the bearing members.

Another object is to provide a combined thrust and radial bearing wherein novel arrangements are made for lubricating the radial bearing by means of the oil provided for the lubrication of the thrust bearing.

Another object is to provide a thrust bearing, or a combined thrust and radial bearing, which may be possessed of various combinations of the novel features previously set forth.

These and other objects will appear more fully upon a consideration of the detailed description of the invention which follows.

The invention is capable of receiving a variety of mechanical expressions, several of which are described and illustrated in the accompanying drawings, but it is to be expressly understood that these drawings are for the purpose of illustration only and are not to be construed as a definition of the limits of the invention, reference being had for this purpose to the appended claims.

Referring now to the drawings, wherein like reference characters indicate like parts throughout the several views:—

Fig. 4 is a half axial section, with certain parts shown in full, of another embodiment of the present invention;

Fig. 5 is a half axial section, with certain parts shown in full, of another embodiment of the present invention;

Fig. 10 is a half axial section, with certain parts shown in full, of another embodiment of the invention taken on line 10—10 of Fig. 11;

Fig. 11 is a plan view of the embodiment of the invention shown in Fig. 10 with certain parts broken away and other parts shown in section, the sections being taken approximately on the line 11a—11a and 11b—11b of Fig. 10;

Fig. 17 is a fragmentary axial section of one embodiment of the invention showing one embodiment of the viscosity pumping means for forcing lubricating oil to the radial bearing;

Fig. 18 is a fragmentary axial section showing another embodiment of the lubricating means;

Fig. 19 is a plan view of a portion of the oil pumping ring shown in Figs. 17 and 18;

Fig. 20 is a fragmentary section of the oil pumping ring taken on line 20—20 of Fig. 19;

Figs. 21, 22, 23 and 24 are a side elevation (on line 21—21 of Fig. 22), a plan view, a front elevation, and a fragmentary section, respectively, of one form of jacking means for lifting the runner off the shoes of a thrust bearing.

Figure 1:
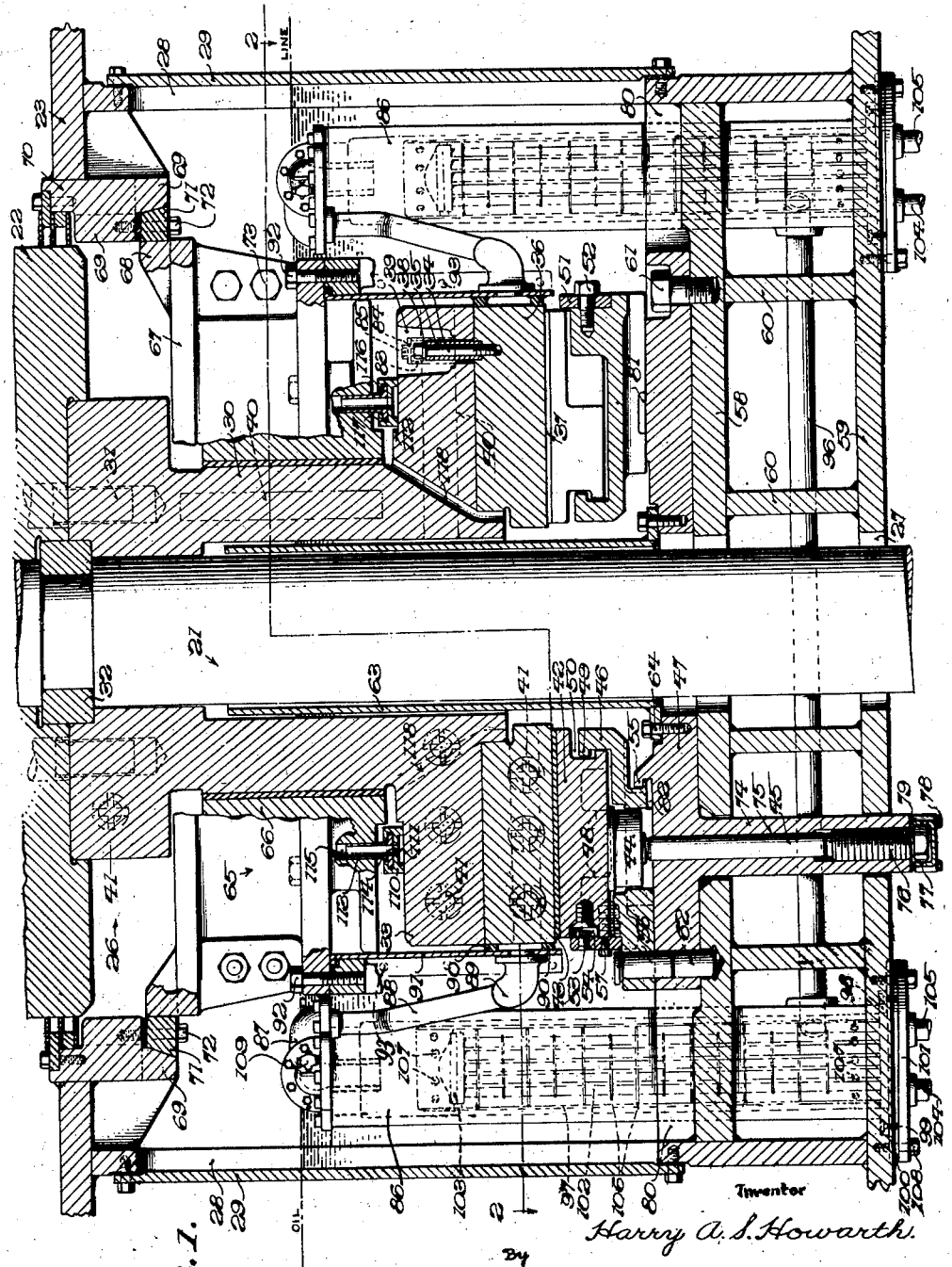
Fig. 1 is an axial section taken on line 1—1 of Fig. 2, with certain parts shown in full and other parts omitted, of a combined thrust and radial bearing illustrating one embodiment of the present invention.
Figure 2:
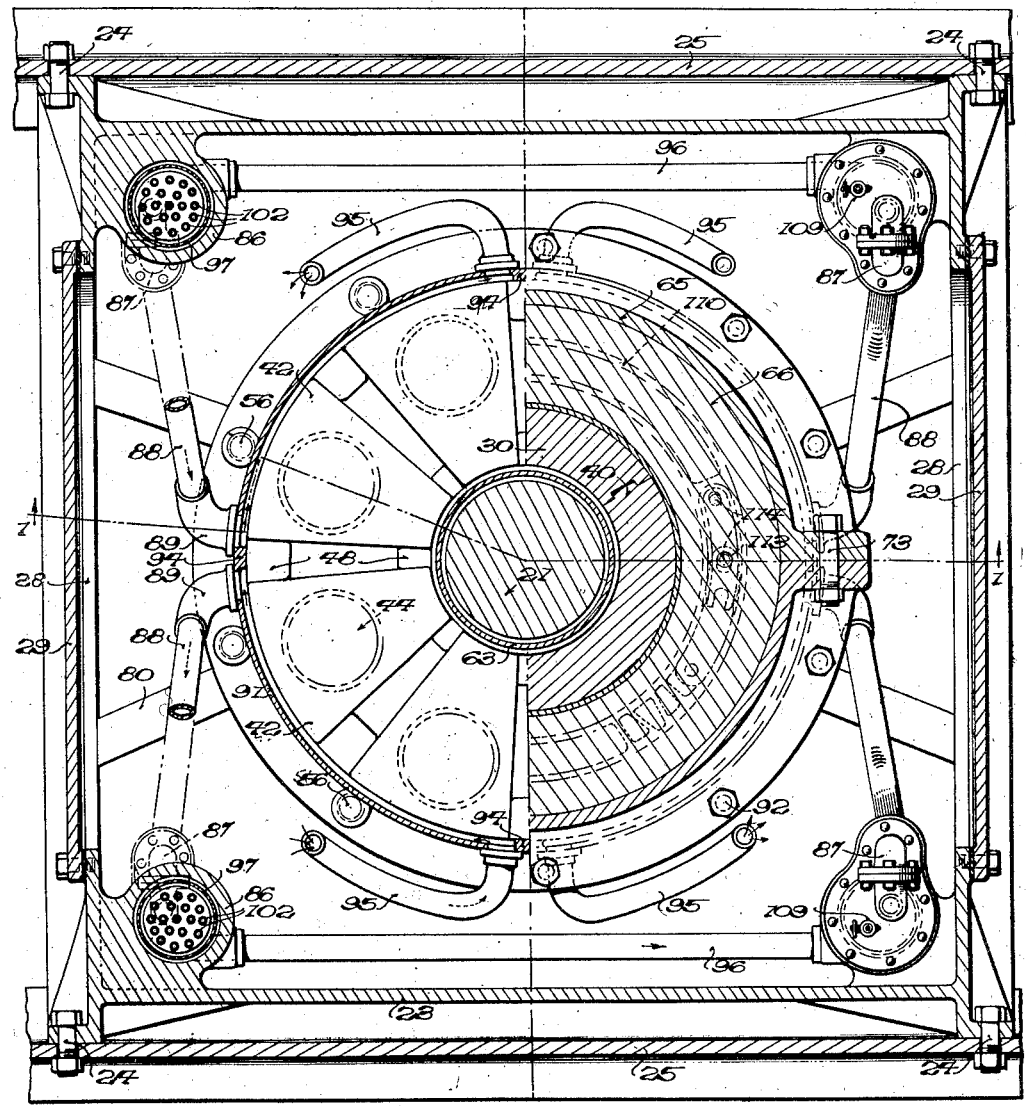
Fig. 2 is a plan view, with certain parts broken away and other parts shown in section, of the embodiment shown in Fig. 1.
Figure 3:
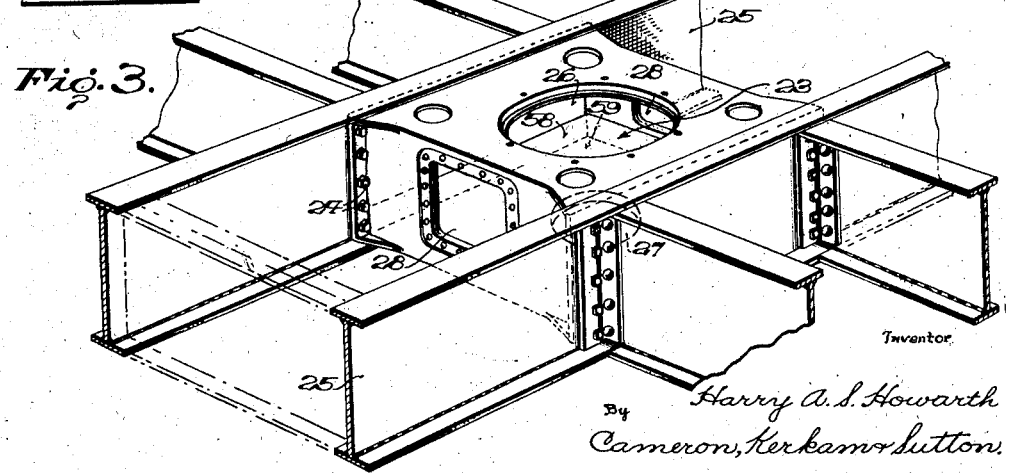
Fig. 3 is a perspective view of a bearing pot or well indicating its assembled relationship to the supporting girders or beams.

Referring first to Figs. 1–3, there is shown therein a combined thrust and radial bearing for a vertical shaft, housed within a pot or well which is secured as a unit to the beams or girders forming the support for the machinery actuated by the shaft, which combined bearing is readily assembled and disassembled about the shaft when in position and which is capable of axial movement as a unit with or relatively to the shaft, is readily accessible from the side for adjustment, inspection, replacement or repair of the parts, and also is readily accessible from below for adjustment of the shoes. This embodiment of the invention also discloses a novel oil circulating and cooling system for the bearing, including cooling units which may be individually inserted into or removed from cooler casings located within the bearing pot or well.

As shown, a vertical shaft 21 carrying a rotor 22 of some suitable piece of machinery, such as a water turbine driven generator, is supported by a combined thrust and radial bearing which in turn is housed or supported in a bearing pot or well 23. As shown best in Figs. 2 and 3, pot 23 may consist of a substantially rectangular box-like structure made as a unit and suitably secured as by bolts 24 to the beams or girders 25 which form the floor or support on which the machinery is located, but it is to be expressly understood that the pot may be of any other suitable construction. Pot 23 is provided in its upper and lower faces, respectively, with enlarged, vertically aligned openings 26 and 27, and in one or more of its side faces with a manhole 28 and suitable oil-tight cover plate 29, although said openings may be omitted to give added strength to the pot when the bearing is movable as a unit into and out of the pot. A pot of the type here disclosed can be furnished by the bearing manufacturer and made as strong and stiff as required to prevent undesired deflections and designed for ready installation in the supporting structure furnished by the manufacturer of the machine. The top of the pot is also shown as provided with four corner openings through which may be inserted the cooler units hereinafter described.

Openings 26 and 27 may, if desired, be substantially equal in diameter, in which case the bearing may be moved into place either from above or below the pot, or, as shown in Figs. 1 and 3, one of the openings may be substantially smaller than the other. In any event, one of openings 26 or 27 should be at least as large as the largest element of the bearing which is to be housed within the pot, so that the bearing may be completely assembled outside of the pot and raised or lowered into position therewithin as an assembled unit. The one or more manholes 28 are provided to render the bearing, when in place about the shaft, readily accessible from the side for purposes of adjustment, inspection, replacement or repair, the bearing being constructed in a manner later to be described so as to facilitate the separation and removal of the various elements either in groups or individually.

Referring now to the combined thrust and radial bearing, a thrust block 30 is provided surrounding shaft 21 and secured to rotor 22 for rotation therewith in any suitable manner as by dowels or bolts 31 and a ring key 32 which is recessed into shaft 21, rotor 22 and thrust block 30. At its lower end, thrust block 30 is provided with a horizontal flange or collar 33 to which is secured in any suitable manner, as by tubular dowels comprising a dowel bolt 34 and cylindrical sleeve or tube 35, a runner 36 having a bearing surface 37. The tubular dowels provided by bolts 34 and sleeves 35 are located by countersinking the upper surface of runner 36 to receive sleeves 35 and then passing bolts 34 through said sleeves and threading the bolts into runner 36, suitable washers 38 being interposed between the heads of the bolts 34 and the upper ends of sleeves 35. Collar 33 of the thrust block 30 is then provided with suitable openings 39 to receive the upper ends of the dowels thus formed, the upper portions of said openings 39 being enlarged to provide access to the tops of said dowels for a purpose later to be described, or the dowels may be extended vertically to any desired extent. By thus providing an elongated dowel, it is evident that thrust block 30 can be lifted a considerable distance away from runner 36 without losing engagement with the dowels.

If desired, both thrust block 30 and runner 36 may be made in halves, in which event the halves may be maintained in proper alignment by a tongue and groove construction indicated at 40, the halves being suitably secured together as by suitable screws or bolts 41.

Coacting with the bearing surface 37 of runner 36 is a stationary thrust bearing member which is shown as composed of a plurality of segmental bearing portions or shoes 42 provided with bearing surfaces 43, although as respects certain features of this invention said stationary bearing member may be composed of a continuous or semi-continuous flexible or rigid construction. Said segmental bearing shoes 42, of which there are eight in the present embodiment, are preferably mounted to tilt both radially and circumferentially—circumferentially to provide for the automatic formation of wedge-shaped oil films between the bearing surfaces, and radially to equitably distribute the bearing pressure on the concentric zones of the bearing surfaces, in accordance with the principles of the Kingsbury bearings—and to this end, they are shown as provided with shoe supports 44 having spherical surfaces mounted on the heads of thrust pins 45 later to be described. The shoes 42 are supported and retained in their operative positions in an annular cage 46 which is in turn supported by and secured to a thrust base ring 47. Cage 46 is provided with suitable lugs 48 for maintaining the shoes 42 in position radially and circumferentially, here shown interposed between contiguous shoes, and with a flange or lip 49 projecting radially outwardly from its inner periphery and engaging a corresponding vertically elongated recess 50 in the inner vertical surface of the shoe. A separate retaining plate 51 is also provided for each shoe 42, and is adapted to be secured to lugs 48 of cage 46 as by screws 52 so as to hold the shoe 42 within cage 46, or if preferred a semicylindrical retaining member may be associated with each half of the cage 46. Each plate 51 is also provided with one or more dowels 53 each of which is adapted to project inwardly into an enlarged counterbored hole 54 formed in the outer periphery of the shoe 42, the clearance provided by holes 54 being greater than that at recess 50 in order that the stripping of the shoe 42 from runner 36 when the latter is lifted will take place first at the narrow inner circumference of the shoe rather than at the outer wider one. This construction prevents dowel 53 from acting as a stripper, but enables it, in conjunction with flange or lip 49 of cage 46, to hold shoe 42 in the cage when the cage and shoes are handled as an assembly.

Cage 46 is preferably made in halves, suitably bolted together if desired (see Fig. 21), and is supported on and secured to base ring 47 by a holding down clip or flange 55 and a plurality of large-headed removable dowels 56. If desired, small locking screws 57 may be threaded into plates 51 directly above each dowel 56 to prevent accidental displacement of said dowels.

Thrust base ring 47 rests upon a supporting deck 58 mounted on or formed integrally with the sides of pot 23 and which may, if desired, constitute the bottom of said pot. As shown in Fig. 1, however, where a deep stiff support is desired for the thrust bearing, deck 58 may be separate and rigidly spaced from the bottom 59 of pot 23 by suitable vertical members or beams 60. Base ring 47 is then secured to deck 58 by suitable screws or bolts 61, and may also be doweled thereto as indicated at 62. Thereby is provided a very stiff rigid thrust base which forms a part of the unitary pot or housing for the bearing and which affords a suitable support for the bearing elements even though the supporting girders for the machine are somewhat yielding under load.

The elements of the thrust bearing just described are adapted to operate in a bath of oil, and suitable means are therefore provided whereby the interior of pot 23 constitutes an oil well. As shown, an oil retaining sleeve 63 closely surrounds shaft 21, but is accurately bored so as not to be in contact therewith, and is suitably secured in place either to base ring 47 or to supporting deck 58 as by screws 64. Oil retaining sleeve 63 thus constitutes the inner wall of the oil well, the outer wall of which may be formed by the sides of pot 23 and the oil-tight manhole plate or plates 29. Suitable means (not shown) may be provided for supplying and removing oil from the oil well thus constituted.

Figures 8, 9:
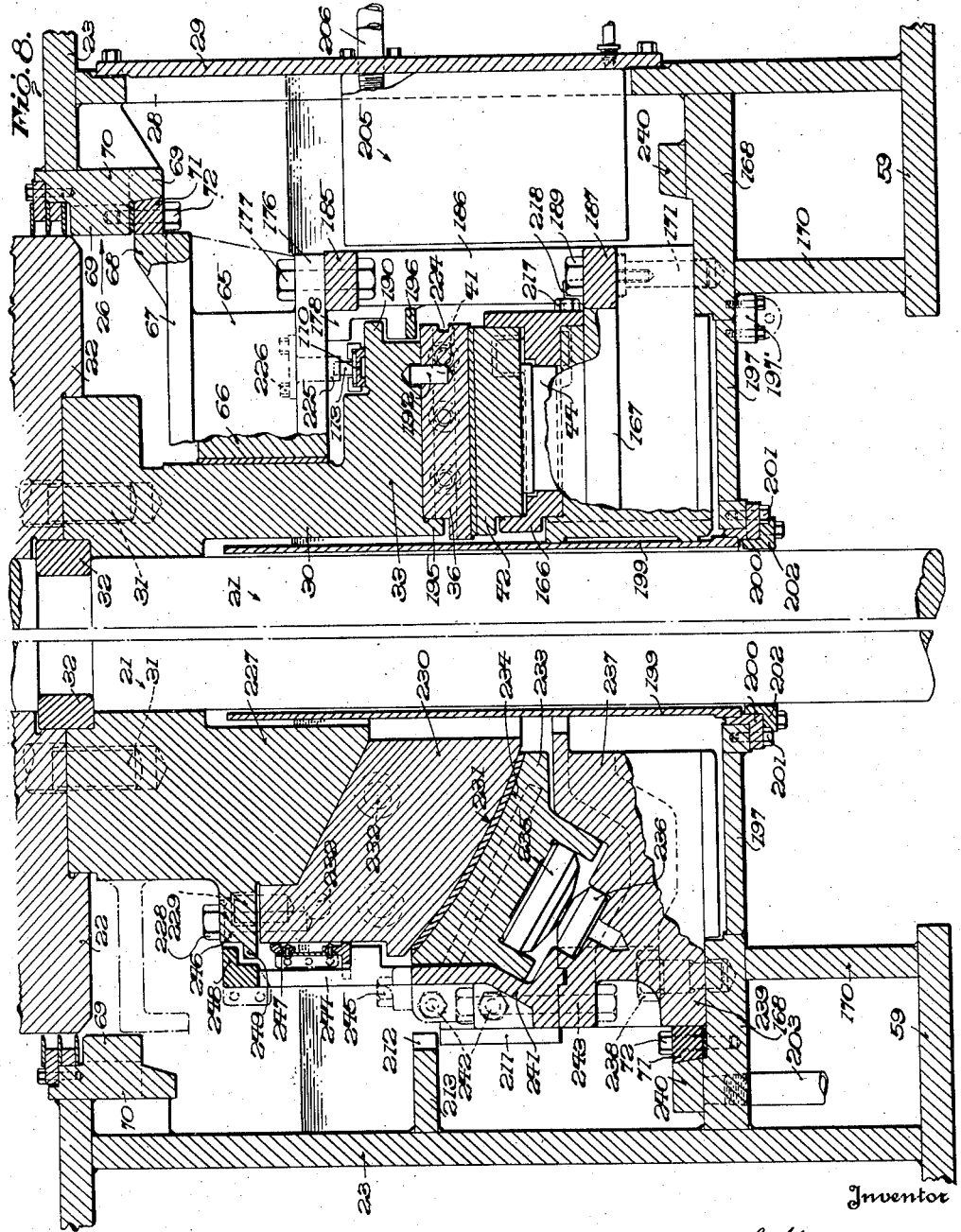
Fig. 8 is a half axial section, with certain parts shown in full, of another embodiment of the invention.
Fig. 9 is a half axial section, with certain parts shown in full, of another embodiment of the invention, the parts of which are interchangeable with those shown in Fig. 8.

In addition to the thrust bearing elements previously described, the combined thrust and radial bearing includes elements providing a journal or steady bearing for the shaft. The radial bearing as respects certain features of the invention may be a ball or roller bearing, but as shown, a journal bearing shell 65 enclosing a suitable surface bearing member 66, which may be either of the shoe type or of the sleeve type, encircles the cylindrical portion of thrust block 30 intermediate flange 33 and the top of said thrust block, the latter thus being journalled in the bearing member 66. Journal bearing shell 65 is supported in any suitable way, as by strut elements as shown in Fig. 8 but not shown in Figs. 1 and 2 to avoid confusion, and provided with an upper flange 67 from which project at intervals around the periphery thereof a plurality of lugs 68 which are adapted to be secured to corresponding lugs 69 formed integrally with a bored centering ring 70 secured to the top of pot 23 and forming the opening 26 therein. Wedge blocks 71 may also be provided to center flange 67 with respect to ring 70, said wedge blocks being secured in position by bolts or screws 72, or the shell 65 may be fitted in the opening in the ring 70 and other suitable means for securing said shell in place may be used. Journal bearing shell 65 and its contained elements are preferably formed in halves, and secured together in any suitable manner as by bolts indicated at 73.

Suitable means are also provided for adjusting the position of shoes 42 from outside of, and in this instance from below the bottom of, pot 23. In the embodiment shown, wherein a deep stiff supporting base is provided by deck 58, strengthening members 60 and bottom 59, thrust base ring 47 is provided with a plurality of cylindrical downwardly extending portions 74, each situated directly under the center of a shoe support 44 and projecting downwardly through deck 58 and bottom 59. Each cylindrical portion 74 is provided with a central bore 75 in which is housed the thrust pin 45 previously referred to, the lower portion of bore 75 being enlarged and internally threaded to receive a jackscrew 76, the upper end of which engages the lower end of thrust pin 45. A suitable lock wrench 77 is provided for the head of each jackscrew 76, said lock wrench being secured to the bottom of cylindrical portion 74 as by screws 78, and having an oil-proof gasket 79 in the joint between said wrench and the bottom of said cylindrical portion 74 in order to prevent leakage of oil from the interior of pot 23 through bore 75 and past the threads of jackscrew 76.

The structure thus far described constitutes a combined thrust and radial bearing, exclusive of the lubricating system, which is capable of assembly as a unit outside of its supporting pot and of being lowered into position about the shaft as a unit, readily accessible from the side for inspection, replacement or repair of the various elements thereof, and conveniently adjustable from the exterior of the supporting pot.

In assembling the combined bearing, the elements may be built up upon thrust base ring 47, after the oil retaining sleeve has been secured thereto by bolts or screws 64, by first placing the two halves of cage 46 thereon and inserting the dowels 56 in their proper openings; the shoes 42 may then be placed in cage 46 and the retaining plates 51 secured in place by the bolts 52 to lugs 48 of cage 46 so as to maintain the shoes 42 in their proper positions; the runner 36 may then be placed in position on top of shoes 42, and the dowel sleeves 35 and bolts 34 secured in place; and the thrust block 30 may then be lowered onto runner 36, the openings 39 in flange 33 of thrust block 30 fitting down over the dowels formed by sleeves 35 and bolts 34 to properly position block 30 and runner 36 relative to one another. Having thus assembled the thrust bearing elements, the two halves of journal bearing shell 65 and its contained elements may be placed around the cylindrical portion of the thrust block 30 and secured together by bolts 73, the journal bearing shell 65 then resting upon its supports.

With the combined bearing thus assembled, it may be lifted as a unit by any suitable means and, rotor 22 and ring key 32 not being in position on shaft 21, lowered as a unit around shaft 21, passing through top opening 26 in pot 23, until the thrust base ring 47 rests upon supporting deck 58 of the pot. It is obvious that in carrying out this lowering operation, care must be taken to see that the cylindrical portions 74 of base ring 47 are so positioned that they will enter the openings in supporting deck 58 and bottom 59, and that the dowels 62 are properly engaged in their openings. When thrust base ring 47 comes to rest on supporting deck 58, the screws or bolts 61 are placed to rigidly secure said ring 47 to the deck 58, and, if not already in place, the thrust pins 45 are inserted into the cylindrical portions 74 and the jackscrews 76 threaded into the lower portion of bores 75 to adjust shoes 42 to their proper height. Upon completion of this adjustment, the lock wrenches 77 are secured against accidental disturbance by screws 78. The journal bearing shell 65 is then centered when the wedge blocks 71 are put in place the whole radial bearing assembly being rigidly secured to the top of pot 23 by the screws or bolts 72. If preferred, however, the radial bearing assembly can be carried by the thrust base when in operative position and centered and secured in position in any other suitable way, or it may be wholly carried by the top of the pot if a sufficiently rigid support is provided thereby.

With the combined bearing thus assembled in place within pot 23, access may readily be had to any of the elements requiring adjustment, inspection, replacement or repair through manholes 28. Should it be desired to remove the journal bearing elements, it is only necessary to remove screws or bolts 72 and wedge block 71, rotate journal bearing shell 65 sufficiently so that lugs 68 will clear lugs 69, remove bolts 73, and then remove each half of the journal bearing laterally, or radially with respect to shaft 21, through manhole 28.

If it is desired to have access to runner 36, or to both runner 36 and shoes 42, thrust block 30 may be raised either by raising shaft 21 and thereby carrying thrust block 30 with it through the connection of said block with rotor 22, or by removing rotor 22 and ring key 32 from shaft 21 and lifting thrust block 30 independently of the shaft. The distance which thrust block 30 is lifted will depend upon whether or not it is desired to remove runner 36 from its normal position; if so, it will be necessary either to raise thrust block 30 sufficiently high to entirely clear the tubular dowels formed by bolts 34 and sleeves 35, or to remove said dowels through the enlarged openings 39 in the flange 33 of the thrust block. After thrust block 30 has been raised off of runner 36, which stripping action may be facilitated by turning or milling grooves in the lower face of flange 33 of the thrust block to divide it into moderate size squares that will aid in preventing it sticking to the runner, the runner may either be inspected or repaired while in its normal position, or it may be removed from the pot independently of or together with the shoes 42 after the bolts 41 have been removed.

When removed independently of the shoes, it is only necessary to remove bolts 41 to divide runner 36 into halves, remove one half laterally, or radially with respect to shaft 21, through manhole 28, and if diametrically opposite manholes are not provided then rotate the other half on shoes 42 until it can be also removed through the first manhole 28. Should manholes be provided in two sides of pot 23, as shown, it will not be necessary to rotate the second half of runner 36 before removing it from the pot. Should, however, it be desired to inspect, replace or repair both runner 36 and shoes 42, each half of the supporting cage 46, with the shoes supported thereby and the corresponding runner half, may be removed from the pot simultaneously. To accomplish this simultaneous removal, the bolts 41 in runner 36 must first be removed, as well as any bolts securing the two halves of cage 46, and the dowels 56 are taken out after first removing locking screws 57. Each half of cage 46 with its supported shoes 42 and the superposed half of runner 36 may then be withdrawn laterally from the pot through manhole 28. In order to facilitate this removal, rails 80 may be provided within pot 23 extending from the periphery of thrust base ring 47 to the bottom edge of manhole 28 and at the same height as the surface of said base ring. With such a construction it is evident that the parts may be merely slid radially with respect to shaft 21 without the necessity of lifting these parts.

If two manholes are not provided, the other half of the cage, shoe and runner assembly may then be rotated on base ring 47 until in position to be withdrawn through the manhole. In order to make such rotation easier, suitable short eccentric shafts with rollers may be placed at three points on the back half of cage 46, and by means of hexagon heads on the ends of these shafts they may be turned by a wrench so as to lift the cage from the base ring far enough to raise the shoe supports from the ends of the thrust pins 45. When the weight of the half cage is on the three rollers, it may be rotated more readily from the back to the front of the pot opposite manhole 28. After rotation has taken place, if one of the rollers is made in the form of a caster, it may be swung around to make all three rollers substantially parallel and further facilitate the sliding of the cage, and the parts supported by it, out through the manhole. Even though thrust pins 45 extend above the upper face of base ring 47, and even if the roller device described is not provided, the thrust pins will not interfere with rotation or removal of the halves of cage 46 due to the provision of suitable circumferential recesses 81 which allow rotation of cage 46, and suitable radial recesses 82 which provide for radial removal.

Should it be desired to have access to shoes 42 only, suitable means are provided for raising runner 36 with thrust block 30 so as to allow shoes 42 to be inspected or removed independently of runner 36. As indicated in broken lines in Fig. 1, a sleeve or pipe 83, which may extend vertically to any suitable height may be placed around each sleeve 35 in openings 39, a washer 84 placed across the top of sleeve 83, and a screw 85 passed through washer 84 and threaded into the head of dowel bolt 34 which is especially adapted to receive said screw. When these auxiliary sleeves and screws have been placed in position, runner 36 may be stripped from shoes 42 by raising thrust block 30 as previously described. If it is then desired to remove all of the shoes, this may be done by separating the cage and removing its respective halves through manhole or manholes 28 as previously described. Should, however, it be desired to remove any of the shoes individually, it is only necessary to remove screws or bolts 52 of the retaining plate 51 of the shoe in question, and to slide the shoe out of cage 46 independently of the others. If several shoes are to be removed in succession the bearing parts may be intermittently rotated to bring the successive shoes into convenient position for access thereto.

It will thus be seen that with the combined thrust and radial bearing described, maximum accessibility from above and from the side is provided, and maximum flexibility is afforded as to the manner in which the elements may be removed from the pot. While by way of illustration it has been shown how the bearing parts may be assembled before being introduced into the pot as a unit it will now be apparent that the bearing parts may also be conveniently assembled around the shaft after the shaft has been installed.

Referring now to the oil circulating and cooling system whereby oil is supplied for lubrication of both the thrust and radial bearing elements, novel circulating means operating on the principle of the viscosity pump are provided in combination with a reversible cooling system employing cooling units which are individually insertable into and removable from cooler casings, which may be permanently located within the bearing pot or well, either from above or below the pot. As previously mentioned, the portion of pot 23 bounded by oil retaining sleeve 63, deck 58 and the sides of the pot constitutes an oil well to which oil may be supplied and from which it may be drained in any suitable manner. In order to cool this oil in which the thrust bearing elements are continually submerged, a novel arrangement of bath coolers has been provided which occupies a minimum of space and provides for maximum flexibility in the operation of the system so that the individual units may be withdrawn from the pot for cleaning or replacement without necessitating the draining of the main well.

As shown best in Fig. 1 (see also Fig. 10), a plurality of cooler casings 86, preferably four in number, are situated in the corners of the pot 23 and extend from the bottom 59, at which end they are open, upwardly through deck 58 to approximately the average oil level which is maintained within the well. Although cooler casings 86 have been shown as cast integrally with the sides of pot 23, it will be understood that these casings may be formed separately, if desired, and secured in place by any suitable means, but the integral construction gives greater stiffness to the pot. Each casing 86 is provided with a siphon pipe connection 87 at its top which is connected by a pipe 88 and slip joint 89 to one end of one segment of a suitable oil pumping device which, in the embodiment illustrated, comprises a pair of vertically spaced annular rings 90 of substantially rectangular cross section closely encircling the outer periphery of runner 36 and/or flange 33 of thrust block 30, and suitably secured as by welding to a suitable cylindrical baffle plate 91 which surrounds the moving parts of the thrust bearing and which in the form shown is vertically suspended from the lower flange of the radial bearing shell 65, as by screws or bolts 92. Baffle plate 91 is preferably formed in halves which are secured together as indicated at 93. The space formed between the two rings 90, the periphery of the movable member of the thrust bearing and baffle plate 91, constitutes a viscosity pumping ring.

Figure 16:
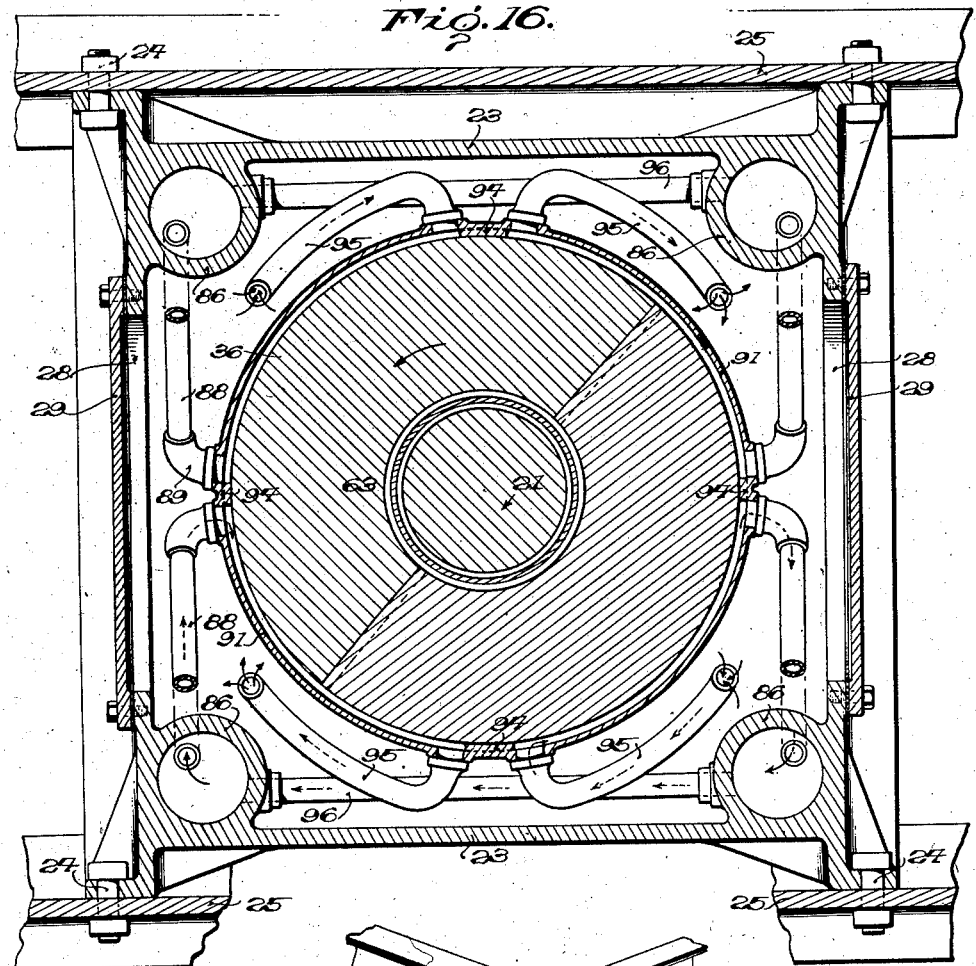
Fig. 16 is a schematic horizontal section of one embodiment of the present invention showing the circulating system for the oil lubricating the bearing, and indicating the construction of the bearing pot shown in perspective in Fig. 3.

As shown in Figs. 2 and 16, the viscosity pumping ring thus formed is divided into a plurality of segments, corresponding in number to the number of coolers, by vertical dams 94 extending between the two rings 90. As mentioned above, pipes 88 are connected by slip joints 89 each to one of the ends of one pumping segment, and the other end of each segment is provided with a suitable pipe 95, the open end of which terminates at any suitable location within the oil well. The cooler casings 86 are also connected in pairs by suitable by-pass pipes 96 connected to said casings adjacent their bottoms and the pipes 88 of each pair are connected to the viscosity pumping ring at points substantially 180° apart.

As will be seen best from the schematic showing of Fig. 16, the circulating system thus far described provides a continuous, reversible means for pumping oil from the oil well through the coolers and back again to the oil well. For example, by following the arrows shown in Fig. 16 it will be seen that for either direction of rotation of shaft 21 and the thrust bearing elements 33 and 36, oil from the well will enter pipes 95 at two diametrically opposite points, pass through two diametrically opposite segments of the pumping ring, thence by pipes 88 into the top of two diametrically opposite cooler casings 86, out at the bottoms of said casings through by-pass pipes 96 to the bottoms of the other casings 86 of the pair, leave the latter casings by pipes 88 at the tops thereof, be pumped through the other pair of diametrically opposite segments of the pumping ring, and finally be discharged through pipes 95 at two diametrically opposite points in the oil well spaced substantially 90° from the points at which the oil originally entered the circulating system. Reversal of the direction of rotation of the shaft and thrust bearing elements will merely reverse the points at which the oil enters and leaves the system and the direction of flow through the various cooler casings.

Although cooler casings 86 could be equipped with permanently installed cooling coils, as is the case in some of the other embodiments of the present invention, in the form shown in Figs. 1, 2, 10, 11 and 16 separate cooling units are provided which may be inserted into and removed from the casings 86 from the exterior of pot 23. To this end, there is provided for each cooler casing 86 a cooling unit comprising a shell 97, cylindrical in form and preferably made of sheet metal, having a flange 98 at its lower end which is adapted to be secured as by screws 99 to the flange 100 of a header 101 of a bundle of water tubes 102. This construction avoids the need for machining the interiors of the casings 86. Tubes 102 are secured in any suitable manner to header 101 and at their opposite ends to another header 103, the two headers being suitably constructed to provide for the circulation of cooling water from header 101 through half of tubes 102 to header 103 and back to header 101 through the other half of the tubes. Suitable supply and discharge pipes 104 and 105 are connected to header 101. The water tubes 102 also support a plurality of baffles 106 which are adapted to cause the oil to take a circuitous course in passing through shell 97, said shell being provided with a plurality of apertures 107 formed in each end thereof to provide for inlet and outlet of the oil from and to the interior of shell 97. Shell 97 and the assembly comprising headers 101 and 103 and water tubes 102 are secured together exteriorly of cooler casing 86 by means of screws 99, and then the entire cooling unit may be inserted into casing 86 from the bottom and secured in place by suitable screws 108.

It will thus be seen that with the oil circulating system in operation and with the cooling units in place in casing 86, oil will be supplied to either the top or bottom of each casing 86, dependent upon the direction of rotation of shaft 21, will enter apertures 107 in shell 97, traverse the length of said shell in a circuitous path due to baffles 106, be cooled during such passage by contact with water tubes 102 through which water is constantly circulated, pass out of shell 97 through apertures 107 at the opposite end thereof, and leave casing 86 at the opposite end from which it entered. Should it be desired to remove any one of the cooler units for inspection, cleaning or repair, it is necessary only to drain the oil from the particular casing 86 by a suitable drain connection (not shown), provided a stop valve is provided in by-pass pipe 96, or, if no such pipe is provided, to drain from the two interconnected casings. Screws 108 may then be removed and the entire cooling unit removed from the bottom of pot 23. There is no danger of oil siphoning into the open casing 86 from the oil well because of the location of connections 87 at the tops of said casings which are normally at or above the oil level in the well. When the cooling unit has been replaced within casing 86, and the circulating system is again in operation, it may be desirable to exhaust the air from the interior of said casing, and for this purpose a suitable vent 109 is provided at the top of each casing. By thus providing the cooling unit separate from the cooler casing, not only is cleaning, inspection and repair facilitated, but also the necessity for accurately machining the inside of casing 86 is avoided. As shown in Fig. 2, the casings 86 are preferably located in the corners of the pot, and therefore the pot can be made of transverse dimensions that exceed the diameter of the bearing parts only so much as required by retaining proper access to the bearing parts. The casings in the corner also give added strength to the pot, while with bearings removable as a unit from the pot, the end removability of the cooling units enables the pot to be made of a very rigid construction at all four sides, omitting the manholes and covers and making all four sides of equal strength and rigidity if desired.

Suitable means are also provided for lubricating the radial bearing elements of the combined bearing by means of the oil provided in the oil well for the lubrication of the thrust bearing elements. In the embodiment illustrated in Figs. 1 and 2, a device operating upon the principle of the viscosity pump is provided to force oil upwardly from below the level of the oil in the well to the parts of the radial bearing, some of which are situated above this level. As shown, an annular channel shaped pumping ring 110 rests upon the upper face of thrust block flange 33, the space enclosed by the arms of the channel and the face of flange 33 forming a viscosity pumping chamber 111. Ring 110 is preferably formed in two halves secured together in any suitable manner and is maintained in its proper radial position on flange 33 as by a shoulder 112 formed on said flange interiorly of the ring.

Although pumping chamber 111 may extend completely around pumping ring 110 with the exception of a single dam interposed therein, so as to form only one pumping inlet and outlet, it is preferable to divide the pumping chamber into a plurality of segments so as to balance the pumping forces and to afford more efficient lubrication. Accordingly, in the present embodiment there are two substantially semicircular pumping segments or chambers 111, each of which is provided with a vertical outlet pipe or tube 113 adapted to register with one or the other of a pair of ports 114 opening into the respective segments of chamber 111 depending upon the position assumed by said ring as it shifts with the thrust block upon change in the direction of rotation thereof, as more fully described in conjunction with Figs. 17, 19 and 20. The outlet tubes 113 are fixedly held in suitable vertical passages 115, preferably formed in radial bearing member 66 on the dividing line between the halves thereof, and communicate with the various oil distributing grooves provided in said bearing member. The lower end of each tube 113 is provided with a suitable flange 116 which is engaged by a holding down lip 117 formed on pumping ring 110, and is thereby maintained in contact with the upper surface of said ring.

In accordance with the principle of the viscosity pump, oil in the space between flange 33 of the thrust block 30 and the lower portion of the radial bearing assembly, to which space a supply of oil is insured by the provision of radially extending centrifugal pumping channels 118, passes through the ports 114 which are not covered by tubes 113, is forced through the segments of pumping chamber 111 until it strikes the dams interposed therein, and is thereupon deflected upwardly through the other ports 114 into tubes 113 and thence into passages 115 which convey the oil to the surfaces of the radial bearing to be lubricated.

Another form of viscosity pump for supplying oil to the radial bearing members, and which can be readily substituted for the type shown in Fig. 1, is disclosed in Figs. 17, 19 and 20. As shown therein, the pumping ring 119, preferably made in halves and secured together as by suitable bolts at diametrically opposite points, rests upon flange 33' of a thrust block 30' adjacent the outer periphery thereof and is provided with a vertical downwardly extending guiding flange 120 which has a free running fit with the periphery of flange 33'. Any possibility of a binding of ring 119 against radial bearing member 66', which is liable to occur when there is a close fit between the pumping ring and the lower end of said bearing member and which then prevents the ring from shifting its position when the direction of rotation of the thrust bearing elements is reversed, is thus obviated.

Each vertical tube 121, of which there are preferably two, spaced at diametrically opposite points and on the dividing line between the two halves of the radial bearing, is provided with a lobe shaped flange 122 which rests on the upper surface of pumping ring 119 and is maintained in contact therewith by holding down lips 123 which, together with the upper face of ring 119, form a circumferentially elongated T-shaped groove 124 allowing relative movement of said ring with respect to said tube. Each tube 121 is adapted to register with one or the other of a pair of ports 125 communicating with the pumping chamber formed between the lower face of ring 119 and the upper face of flange 33' of the thrust block 30'. Interposed between ports 125 is a dam 126 which, together with the corresponding dam diametrically opposite, divides the pumping chamber into a plurality of pumping segments. A pair of bridges 127 may also be provided, if desired, at points substantially 90° from the dams 126 in order to decrease wear of the pumping ring. Pumping ring 119 is also provided with an upwardly extending lug 128 which is adapted to project into a circumferentially elongated recess 129 formed in the radial bearing member 66', the distance between the ends of said recess being equal to the center to center spacing between ports 125. Recess 129 and lug 128 are so positioned with respect to tube 121 and ports 125 respectively, that when lug 128 abuts either end of said recess, tube 121 is in registry with one or the other of ports 125. This construction permits automatic reversal of the pumping elements upon reversal in the direction of rotation of the thrust bearing element.

The oil which is circulated by means of this viscosity pump is supplied to the pumping chamber through the ports 125 which are not at the time in registry with tubes 121, said oil being supplied by centrifugal action to the space between flange 33' of the thrust block and the lower face of radial bearing member 66', through suitable radially extending passages 130 and 131. Either of these passages may be used, but should passage 131 be used, passage 130 may be plugged and seal ring 132 omitted. After being circulated through the pumping segments of the pumping chamber, the oil leaves through ports 125 and tubes 121 and passes through suitable pasages 133 to the bottom of oiling grooves 134 formed in the surface of the journal bearing.

Since the pumping ring is provided with a pair of tubes 121 and dams 126, and since the ring is automatically reversible, it will be seen that both segments of the pumping chamber are active at the same time and that oil is being forced to the radial bearing at two diametrically opposite points simultaneously. It will also be evident that the number of such tubes may be increased, if desired, so as to increase the number of pumping segments and the number of points at which oil is forced to the radial bearing.

Still another system for lubricating the radial bearing is disclosed in Fig. 18. The details of the pumping ring and tube in this embodiment are substantially the same as those shown in Figs. 17, 19 and 20, but instead of delivering the oil to the radial bearing at the bottom of the oil grooves formed therein, tubes 121 deliver to substantially vertical passageways 135 which supply oil to a sealing groove 136 at the top of the radial bearing. Oil is also supplied by centrifugal action through radially extending passages 137 formed in flange 33' of the thrust block to the space between said flange and the bottom of the radial bearing shell, and thence to horizontal passages 138 in the bearing member 66' and vertical grooves 139 in the bearing face of the bearing member, the latter being connected at their upper ends to the sealing groove 136. Groove 136 is also provided with a pair of restricted overflow outlets 140 leading to return conduits which conduct the lubricant back to the oil well.

During normal operation of the bearing, the centrifugal pumping device provides an adequate supply of oil through passages 138 and 139 to lubricate the bearing, and the amount supplied by the viscosity pump is relatively small and passes through sealing groove 136 to overflow passages 140. Should the flange 33' and the associated thrust bearing element be rotated at low speed, however, the centrifugal pump becomes inoperative to supply the requisite amount of lubricant, and at the same time the pumping action of the viscosity pump is increased due to the slower speed of rotation. Oil then is supplied from the viscosity pump through passages 135 to sealing groove 136 and flows down vertical grooves 139, and then returns to the viscosity pump. While under this condition the oil is not cooled before returning to the radial bearing grooves, this is not objectionable because of the slow speed of the bearing parts.

Another form of combined thrust and radial bearing embodying the present invention is illustrated in Fig. 4, wherein a combined bearing accessible from the side and adjustable from below is housed or supported in a pot which is smaller and of lighter construction than that disclosed in Figs. 1, 2 and 3. As shown, pot 23, which is of the same general construction and is secured to the supporting beams or girders in the same manner as the pot indicated in Fig. 3, extends only slightly above flange or collar 33 of thrust block 30 and does not enclose the radial bearing members 65 and 66. Also, as here shown, the top and bottom openings 26 and 27 of the pot are of substantially the same diameter so that certain of the thrust bearing elements may be moved into and out of the pot either from the top or the bottom. Further, pot 23 is not provided with a supporting deck, but an enlarged thrust base ring 141 is secured to bottom 59 of the pot from underneath by means of suitable bolts or screws 142 which pass through bottom 59 and are threaded into suitable supporting blocks 143 within the pot, making an oil-tight joint with the bottom 59.

The details of the thrust bearing elements of Fig. 4 are substantially the same as those previously described in connection with Figs. 1 and 2, with the exception of the construction of the shoe cage, the means for retaining the shoes within the cage, and the base ring. In the embodiment shown, the shoes 42 are supported on blocks 144 housed within cage 145, said blocks being in turn supported, through substantially spherical bearing surfaces 146, on the upper ends of thrust pins 45. Thrust pins 45 are housed within the bores 147 of suitable cylindrical extensions 148 connecting, and preferably formed integral with, the base ring 141, the lower ends of said bores 147 being threaded to receive jackscrews 76 for adjusting the position of shoes 42 in the same manner as previously described. Shoes 42 and blocks 144 are maintained in their proper places radially and circumferentially within cage 145 by suitable partition walls 149 and lugs 150 and by a retaining ring or band 151 which forms the outer wall of cage 145 and is removably secured thereto as by bolts or screws 152 threaded into lugs 150, although separate retaining plates for each shoe may be used if preferred. Ring 151 as shown is made in halves, as is also the cage 145, the two halves of the ring being secured together by suitable bolts as indicated at 153. Both the inner wall of cage 145 and the retaining ring 151 are provided with lugs 154 which project into vertically elongated recesses 155 formed in the inner and outer peripheries of shoes 42, and act to strip the shoes from runner 36 when the latter is lifted.

Oil circulating means of the viscosity type are also provided, baffle plate 91 and rings 90 surrounding the rotating parts of the thrust bearing and constituting a viscosity pumping ring similar to that disclosed in Figs. 1 and 2. The oil in the well may be cooled by any suitable means, such as a bank of cooling coils 156 carried by cover plate 29 of manhole 28, to which cooling water is supplied through pipes 157.

The radial bearing elements in this embodiment surrounds the elongated cylindrical portion of thrust block 30 above flange 33, and although a portion of said elements extends below the level of the top of pot 23, the radial bearing as a whole is exterior of the pot and is supported on the top thereof by a suitable plate or flange 158. As shown, the radial bearing is a journal bearing of the shoe type and is lubricated by a viscosity pump of the same type as that described in connection with the embodiment of Figs. 1 and 2. If desired, the journal bearing may be provided with oil seal rings 159 and with a vent pipe 160 for removing oil vapors so as to prevent their passage up to the generator or other machinery mounted on shaft 21. The shoes 66 of the journal bearing are shown as adjustable, jackscrews 76' and thrust pins 45' being shown, and it will be noticed that said jackscrews are so disposed as to be readily accessible to permit adjustment of the radial bearing shoes.

In the structure just described, it is evident that the radial bearing elements may be placed and removed without entering the pot and independently of the elements of the thrust bearing. All of the latter elements, however, may be raised into position from below the bottom of the pot and removed in the same way when desired. The thrust block, runner and shoes are also accessible from above through the top opening 26 of the pot after the radial bearing elements have been removed. The thrust bearing elements may also be reached through manhole 28 in the side of the pot after cover plate 29 and its supported cooling coils 156 have been removed, in which event not only may the halves of the runner 36 be separately withdrawn and inserted, but the halves of the cage 145 with the shoes and ring sections 151 carried thereby may be separately withdrawn and inserted, or the shoes can be separately withdrawn from and inserted into the cage after the ring sections 151 have been removed.

The embodiment shown in Fig. 5 is substantially the same as that of Fig. 4 except that the shoe cage 145 of the thrust bearing is adapted to house in space 161 either a series of overlapped equalizer plates or spring equalizing means of the character disclosed in the patents of Albert Kingsbury No. 1,428,640, of September 12, 1922, or No. 1,754,324, of April 15, 1930, respectively, instead of blocks 144 and the adjusting means constituted by thrust pins 45 and jackscrews 76. If springs are used the shoes may be grooved at 42' to receive dashpot plates as in Fig. 7 of Kingsbury Patent No. 1,754,324. By eliminating the jackscrews, it is no longer necessary that the bearing be accessible from below for adjustment, and the thrust base ring 162 may therefore be supported by and secured to an intermediate supporting deck 163 formed integrally with the sides of pot 23 and rigidly spaced from the bottom 164 thereof by suitable vertical members or beams 165. In this construction, the bottom opening 27 of pot 23 is substantially smaller than top opening 26, and the thrust bearing elements can therefore be moved into place axially of shaft 21 only from above. With the exception of the differences mentioned, this embodiment possesses the same advantages in the way of accessibility as do the embodiments previously described.

Figure 6:
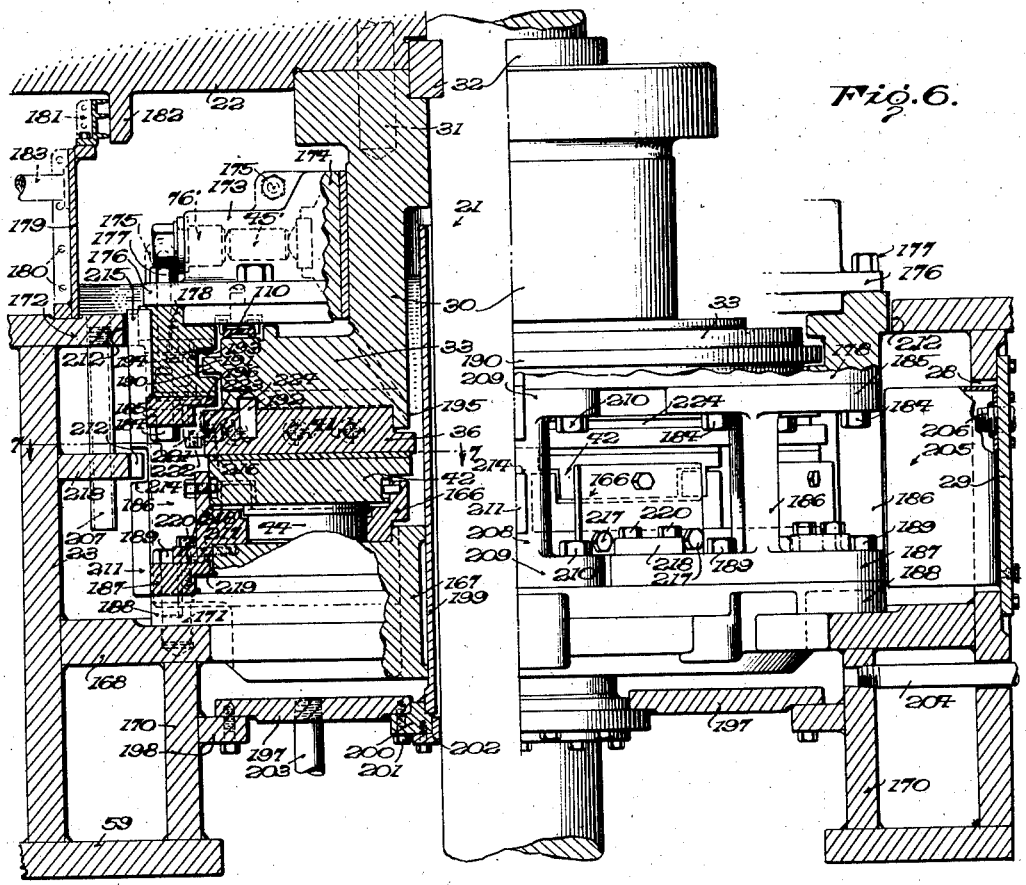
Fig. 6 is an elevation, half in axial section, of another embodiment of the present invention, the half axial section being taken on a plane substantially at right angles to the plane of the elevation.
Figure 7:
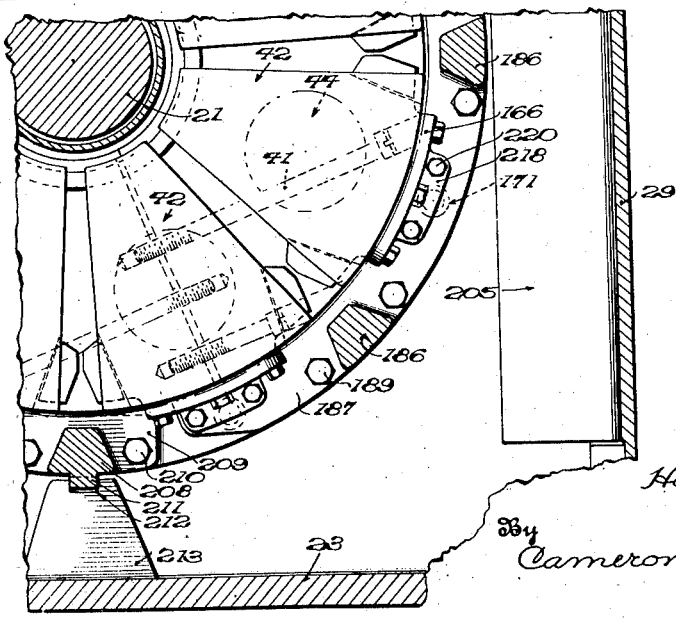
Fig. 7 is a fragmentary horizontal section taken on line 7—7 of Fig. 6.

Referring now to Figs. 6 and 7, there is disclosed therein a novel form of combined thrust and radial bearing which is especially well adapted for installations wherein it is desirable that the shaft be capable of a considerable vertical lift without danger to the bearing parts. As it is undesirable to separate the thrust bearing surfaces, or to slide the journal bearing surfaces, during such a lifting operation, novel means have been provided for supporting the entire bearing structure from the flange of the thrust block so that the combined bearing may be moved vertically as a unit either with the shaft or independently thereof.

As shown, the principal elements of the combined bearing, the supporting shaft 21 and its rotor 22 are substantially the same as in the embodiments already described, including a thrust block 30 secured to rotor 22 and shaft 21 by bolts 31 and ring key 32, respectively, and having a flange or collar 33 to which is doweled a runner 36 supported by a stationary thrust bearing member comprising a plurality of shoes 42, here shown as eight in number, each shoe 42 and its supporting block 44 being mounted in an individual cage 166 which is in turn supported by a deep base ring 167 which may contain pressure equalizing means of any suitable type. Base ring 167 is preferably made solid for strength and is supported by and secured to a supporting deck 168 formed integral with the sides of, and rigidly spaced by suitable vertical members or beams 170 from the bottom 59 of, pot 23. Suitable countersunk dowels 171 may be provided for securing base ring 167 to deck 168 to prevent relative rotation therebetween.

The pot 23 in which the bearing elements are supported is similar to that disclosed in Figs. 4 and 5 in that the top plate or flange 172 of the pot is located only slightly above flange 33 of thrust block 30 and therefore does not enclose the radial bearing elements within the pot. As shown, the radial bearing elements comprise a casing or shell 173 containing suitable tiltably mounted bearing members 174, the entire journal bearing assembly being made in halves which may be bolted together as indicated at 175. The radial bearing casing or shell 173 is also provided with a horizontal flange 176 whereby said shell is adapted to be removably secured as by screws or bolts 177 to a lifting ring 178 which surrounds the periphery of flange 33 of thrust block 30 and performs a plurality of functions later to be described. A cylindrical oil retaining casing 179, also made in halves adapted to be secured together as indicated at 180, is secured in any suitable manner to top plate 172 of pot 23 and surrounds the radial bearing assembly, and is provided at its top with a comb 181 which cooperates with a suitable downwardly extending flange 182 formed on rotor 22 to prevent the escape of oil at that point. Casing 179 may also be provided, if desired, with a suitable vent pipe 183 for exhausting oil vapors from the space surrounding the radial bearing. The radial bearing shoes are adjustably mounted by jackscrews 76' and thrust pins 45', and said screws are easily accessible above the top plate 172 for adjustment of said shoes when the halves of casing 179 have been removed.

Referring now to the means whereby all of the elements of the combined bearing may be supported from flange 33 of thrust block 30 and lifted as a unit, lifting ring 178, as has already been described, is secured to the flange 176 of the radial bearing assembly and encircles the periphery of flange 33 of thrust block 30. Secured to the bottom face of lifting ring 178 as by screws or bolts 184 are arcuate webs 185 extending around substantially a half circumference of lifting ring 178, said webs being secured to, and preferably made integral with, a plurality of vertical struts 186 the lower ends of which are secured to similar webs 187 which rest on and are secured to a flange 188 of base ring 167 by suitable screws or bolts 189. The assembly or unitary structure comprising upper and lower webs 185 and 187 and vertical struts 186 will hereafter be designated as the "strut element". In place of two semicircular strut elements, a larger number may be used if preferred.

When webs 185 and 187 are secured in place to lifting ring 178 and flange 188 of base ring 167, respectively, struts 186 are positioned opposite the spaces between the shoes, as indicated in Fig. 7, and therefore do not interfere with the removal of the individual shoes when the latter are withdrawn from the bearing assembly in a manner later to be described. Since the strut elements are thus rigidly connected to both base ring 167 and lifting ring 178, and the latter is in turn connected to the radial bearing assembly, and since all of the thrust bearing elements are in turn supported upon base ring 167, it will be seen that there is thus provided a construction rigidly connecting all of the elements of the combined thrust and radial bearing and thereby making it possible to move said bearings as a unit.

As shown, suitable means are provided whereby when the thrust block 30 is lifted or lowered, the combined bearing assembly may be supported as a unit from said thrust block with the aid of said strut elements. To this end, flange 33 of thrust block 30 is provided at its periphery with an outwardly extending collar or flange 190 which projects within a vertically widened circumferential groove 191 formed in the inner periphery of lifting ring 178. With the parts in their normal positions, the space between the top of collar 190 and the top of groove 191 exceeds the height to which dowels 192 of runner 36 extend above the surface of said runner and into flange 33 of the thrust block. Means are provided, however, for inserting at suitable points circumferentially spaced around the lifting ring 178 a plurality of blocks 193 secured to said ring by suitable screws or bolts 194, the inner ends of which blocks extend into groove 191 and decreases the free space above collar 190 to an amount less than the height to which dowels 192 project above the surface of runner 36. It is evident from this construction that with blocks 193 in place, if thrust block 30 is raised collar 190 will abut the blocks 193 before flange 33 has cleared dowels 192, whereas should blocks 193 be withdrawn radially with respect to thrust block 30, collar 190 would not abut the top of groove 191 until flange 33 has completely cleared dowels 192. Thrust block 30 is also provided at its lower end with a cylindrical projection 195 having a telescoping fit with the inner periphery of runner 36, which fit is appreciably longer vertically than the fit between dowels 192 and flange 33. Runner 36 is thus still guided at the bore and centered in position even though the dowels are free.

Suitable means are provided for stripping runner 36 from thrust block 30 when the latter is raised so as to prevent separation of the bearing surfaces of runner 36 and shoes 42 and thus avoid any danger of foreign matter being sucked in between the bearing surfaces due to such separation. To this end, a stripping ring 196 is clamped between top web 185 of the strut elements and the bottom of lifting ring 178 in a position to overhang the outer peripheral portion of the upper face of runner 36. The space between the bottom of stripping ring 196 and the upper face of runner 36 is less than the distance between collar 190 and blocks 193 previously described. To further facilitate the separation of the thrust block and runner, grooves may be turned or milled in the lower face of flange 33 of the thrust block to divide it into moderate size squares which will aid in preventing it sticking to the runner when lifted.

This embodiment of the combined thrust and radial bearing is adapted to operate with its thrust bearing parts submerged in a body of oil. As shown, the oil well comprises the portion of pot 23 bounded by its sides, supporting deck 168, an annular oil-tight bottom plate 197 which rests upon and is suitably secured to a suitable flange 198 formed integrally with one of the stiffening members or beams 170, and an oil retaining sleeve 199 accurately bored and closely surrounding shaft 21, and secured to plate 197 as by a suitable flange 200 and screws or bolts 201. Oil retaining sleeve 199 extends vertically upward around shaft 21 and within the bore of thrust block 30 to a point well above the normal oil level, and may be aligned with the shaft, if desired, by a centering ring 202. Suitable oil supply and drain connections may be made to the well thus formed by pipes either as indicated at 203 connected to bottom plate 197 or as indicated at 204 extending laterally through the sides of the pot. Any suitable means may be provided for cooling the oil within the well, that shown in Figs. 6 and 7 comprising a casing 205 secured to each manhole cover plate 29 and containing suitable cooling coils supplied by pipes 206. The space above top plate 172 of pot 23 and within cylindrical casing 179 is also adapted to contain a certain quantity of oil, and to this end a suitable vertical pipe or pipes 207 may be threaded into top plate 172 and provide communication between the spaces above and below said plate.

Provision is also made for forcing oil to the radial bearing elements under pressure by means of viscosity pump means, indicated at 110, the pumping ring being shown as centered by means of a suitable upwardly projecting rib formed on flange 33 of the thrust block 30.

From the structure thus far described, it will be seen that shaft 21 may be raised a substantial distance without danger to the bearing parts since the combined bearing is so constructed that it may be raised with the shaft as a unit. During such a lifting operation thrust block 30 will first be raised due to the bolted connection with rotor 22. With blocks 193 in place in lifting ring 178, collar 190 of flange 33 of the thrust block will abut the bottoms of said blocks 193 before flange 33 clears dowels 192. If runner 36 and shoes 42 had started upward with thrust block 30 due to the cohesion between their contacting surfaces, runner 36 will have been stripped from the thrust block by stripping ring 196 before collar 190 engaged blocks 193, and runner 36 and the shoes 42 would have settled back, the latter into the cages 166. Upon engagement of collar 190 with blocks 193, the entire weight of all thrust and radial bearing elements is transferred to collar 190 through the rigid construction of lifting ring 178 and the strut elements which are secured both to said ring and to the base ring of the thrust bearing. The entire bearing assembly may thus be lifted off of supporting deck 168, without the necessity for breaking any oil joints.

Relative vertical movement between the combined bearing and shaft 21 may also be obtained by removing bolts 31 between rotor 22 and thrust block 30. Should it be desired only to lift shaft 21, this may then be done independently of the bearing parts, shaft 21 being guided during its lifting operation by bored ring 202 and the upper portion of the bore of thrust block 30. Should, however, it be desired to move the combined bearing axially with respect to shaft 21, as when lowering the bearing into place within pot 23 or removing it therefrom, rotor 22 and ring key 32 should be removed as well as bolts 31. Then, by any suitable means, such as inserting lifting bolts into the holes ordinarily occupied by bolts 31, the bearing assembly may be raised independently of shaft 21. When the bearing is thus being moved for purposes of assembly or disassembly, it is also possible to move the oil retaining shell 199 together with the bearing. Should this be desired, the oil is first removed from the well through drain pipes 203 or 204, plate 197 is detached from flange 198, and said plate is then rigidly secured to the bottom of base ring 167 in any suitable manner as by removing pipes 203 and passing bolts through the holes thus left in plate 197 and threading them into the bottom of base ring 167.

Whenever the bearing structure is moved vertically as a unit, it is desirable that means be provided for maintaining the parts in vertical alignment after dowels 171 of base ring 167 have been lifted out of their recesses in supporting deck 168. For this purpose, suitable vertical guiding struts 208 provided with top and bottom webs 209 are secured to lifting ring 178 and flange 188 of base ring 167, respectively, as by bolts 210, in a manner similar to the strut elements previously described. As shown best in Fig. 7, there are preferably two such guiding struts 208 secured in diametrically opposite positions intermediate the other strut elements and at points situated substantially 90° from the sides of pot 23 in which manholes 28 are located. Each strut 208 has formed integrally therewith an outwardly projecting key 211 which is adapted to engage in keyways 212 machined in top plate 172 of pot 23 and in a suitable guide member 213 secured to and extending inwardly from the wall of said pot. Each key 211 is also provided with a cutout portion 214 in the plane of members 213 in order to allow rotation of struts 208 and keys 211 with the other parts of the thrust bearing as later to be described. Lifting ring 178 is also provided with keys 215 similar to and in vertical extension of keys 211 which have a sliding fit in the keyways 212 in top plate 172 of the pot. The combined bearing is therefore guided and prevented against tilting out of its proper vertical position during lifting at a plurality of diametrically opposite and vertically spaced points at 202, at 213 and at 172.

Although the bearing may thus be moved as a unit vertically, or axially with respect to shaft 21, which permits the bearing to be assembled outside of the pot and then lowered into place through the opening in top plate 172 of the pot, it is also desirable that the individual parts of the bearing be accessible from the sides for purposes of adjustment, inspection, replacement or repair. Suitable means have therefore been provided to allow for maximum accessibility, and maximum flexibility in the manner in which the various elements may be removed laterally, or radially with respect to shaft 21, for such purposes. As has previously been described, the radial bearing elements are supported entirely above the top of pot 23 and are enclosed within a cylindrical casing 179 which is formed in halves and may thus be readily removed from around said bearings after the oil level therewithin has been suitably lowered. If it is then desired to remove the radial bearing, bolts 177 securing the bearing to lifting ring 178 are first removed, and then the radial bearing elements are raised by suitable jacking screws until the bottom of the bearing shell 173 is clear of the top of lifting ring 178. Bolts 175 are then removed dividing the radial bearing into halves, and each half may be moved radially outward in any suitable manner.
Since, as previously described in connection with the preceding embodiments of the invention, the vertical tubes of the viscosity pumping means are situated on the center or dividing line of the two halves of the radial bearing, the removal of these halves leaves the viscosity pumping means in place upon flange 33 of the thrust block for any desired disposition.

To facilitate removal of the thrust bearing elements radially with respect to shaft 21, pot 23 is preferably provided, as previously mentioned, with a pair of manholes 28 in opposite sides of the pot which are covered by cover plates 29 carrying the cooling units, although a single manhole may be used if preferred. Also, suitable permanent or temporary rails (not shown), similar to those shown at 80 in Fig. 1, may be provided for sliding the various parts out through manholes 28.

Should it be desired to remove both runner 36 and shoes 42 simultaneously, bolts or screws 194 of blocks 193 are first removed and said blocks are slid radially outwardly so as to clear collar 190. Thrust block 30 is then elevated in any suitable manner until collar 190 abuts the top of groove 191 at which time flange 33 will be clear of dowels 192 although telescoping projection 195 will still engage the inner periphery of runner 36 so as to center the same. Runner 36 may then be rotated on shoes 42 by any suitable means, as by engagement of suitable turning bars in radial recesses 216 formed in the periphery thereof, until runner bolts 41 reach a position where they are accessible through one of the manholes 28. After runner bolts 41 have been removed, thus dividing runner 36 into its two halves, screws or bolts 184 which secure top webs 185 of the strut elements to lifting ring 178 and bolts 189 securing bottom webs 187 to flange 188 of thrust base ring 167 are removed, thereby freeing the strut elements from their bottom and top supports. It is not necessary to remove struts 208 since they are situated on a line at right angles to the direction in which it is desired to remove the elements from the pot. It is then possible, by grasping struts 186, to move the entire assembly comprising half of cages 166, their supported shoes 42 and half of runner 36 as a unit laterally, or radially with respect to shaft 21, out of the pot through manhole 28.

The shoe cages 166 are normally secured to base ring 167 by bolts or screws 217. Each cage is also provided with a horizontal outwardly extending lip or flange 218 which rests upon lower web 187 of a strut element and has an interlocking engagement therewith indicated at 219. Flange 218 is also provided with suitable bolt holes to receive bolts 220 for rigidly securing the shoe cages 166 to web 187. Preferably, bolts 220 are not normally in place but are provided by removing bolts 217 which secure cage 166 to base ring 167 and using the bolts thus removed to secure flange 218 to flange 187. Therefore, when it is desired to remove the shoe cages simultaneously with the runner, screws or bolts 217 are first removed to disconnect the cages from base ring 167 and then inserted as bolts 220 to secure the cages to the strut elements.

Should pot 23 be provided with only one manhole 28, half of the cage, shoe and runner assembly is removed as described, and then dowels 171, which in such a case are preferable only in the half of flange 188 adjacent the manhole, and which were uncovered by the removal of the first strut element, can be removed so as to enable base ring 167 to be rotated on supporting deck 168 until the other half of the bearing structure is in alignment with the manhole. Before base ring 167 can be rotated in this manner, it is necessary to remove bolts or screws 210 which secure the top web of side struts 208 to lifting ring 178. These struts may then be rotated along with the rest of the assembly supported on base ring 167, the cutout portions 214 in keys 211 permitting rotation of the latter relative to the guiding members 213.

Should it be desired to remove one or more shoes 42 without removing runner 36, suitable means are provided for raising said runner off of the shoes so as to relieve the load thereon and permit them to be withdrawn individually. As indicated in Fig. 6 in broken lines, suitable lifting dogs or jacking blocks 221 are adapted to be secured to lifting ring 178 by suitable screws or bolts 222, each dog or block 221 having a laterally projecting lug 223 which engages a corresponding groove 224 formed in the periphery of runner 36. When using these lifting dogs or blocks, it will be understood that the strut elements must first be removed. Thrust block 30 is then raised in the usual manner until collar 190 abuts blocks 193, and then runner 36 is raised by simply tightening up on bolts 222. To remove any one shoe, it is then only necessary to remove the bolts 217 securing the particular shoe cage 166 to base ring 167, and to slide said cage and its supported shoe laterally or radially with respect to the base ring.

It is also contemplated that instead of individual cages for each shoe, half of the cages may be integrated into a single element and a single retaining strap provided for each shoe to retain it within its portion of the cage. With this construction a single shoe can be removed individually without removing the cage by merely taking off its retaining strap. Such a structure would be similar to that disclosed in the embodiment of Figs. 1 and 2. A bracket may also be provided, and held in place by bolts or screws inserted into the holes normally used for retaining the strap in position, to receive a shoe as it is withdrawn from the cage.

If, in the embodiment disclosed in Figs. 6 and 7, it is not required that the combined bearing be capable of movement axially of shaft 21 as a unit, the strut elements described may be omitted and the bearing structure considerably simplified. In this event, lower flange 176 of the journal bearing could be bolted into a suitably placed recess in top plate 172 of the pot. It will also be understood that the means for adjusting the shoes of the thrust bearing from below the pot may be incorporated into the structure shown by merely providing the base ring with cylindrical extensions housing thrust pins and jackscrews similar to those shown in the embodiments of Figs. 1 and 4.

It is also to be noted that in the embodiment of Figs. 6 and 7, not only are the means for adjusting the journal bearing shoes so placed as to be easily accessible, but the entire journal bearing structure including the adjusting means for the journal bearing shoes is carried from the base ring through the strut elements and lifting ring.

Referring now to Figs. 8 and 9, there is shown therein the structure of Figs. 6 and 7 modified, first, to totally enclose the radial bearing elements as well as the thrust bearing elements within the pot, and secondly, to provide a pot structure in which either a plane thrust bearing or a spherical thrust bearing may be used interchangeably. With the exception that the plane bearing shown in Fig. 8 is shown opposite a manhole, while the structure in Fig. 9 is shown at a position 90° therefrom, or opposite a solid wall of the pot, these two figures are to be taken as alternatives.

Referring first to the embodiment of Fig. 8, there is disclosed therein a combined thrust and radial bearing all of the elements of which are housed within pot 23 and may be moved either axially or radially with respect to shaft 21 either as a unit or in unitary sections as may be desired. The pot shown is of substantially the same construction as that illustrated in Figs. 6 and 7 except that the top of the pot is at a level higher than the radial bearing and is provided with suitable means similar to those shown in Fig. 1 for maintaining the radial bearing in its proper position, this figure showing in detail a construction suitable for supporting the radial bearing of Fig. 1. The bottom of the pot is closed by a removable plate 197 which may be made in halves if desired and retained in place by a clamping ring 197'. The thrust bearing elements, although not shown in as great detail, are substantially the same as those disclosed in Figs. 6 and 7 and will therefore not be described in detail.

The radial bearing elements, however, instead of being located above the top of pot 23 are supported on top webs 185 of the strut elements in such a position that lugs 68 projecting from upper flange 67 of the radial bearing shell 65 lie adjacent corresponding lugs 69 formed integrally with centering ring 70 which is secured to the top of pot 23 and forms the opening 26 therein. As in Figs. 6 and 7 the radial bearing elements may be adjustable. Suitable wedge blocks 71 may be secured to lugs 69 by screws or bolts 72 to clamp or lock the radial bearing against radial or lateral displacement as heretofore described in conjunction with the embodiment of Fig. 1, or the shell 65 may be directly centered in ring 70. The web elements are secured to base ring 167 by screws or bolts 189 in a manner similar to that disclosed in Figs. 6 and 7.

To raise the combined bearing as a unit, either together with or independently of shaft 21, it is only necessary to remove bolts 72 and wedge blocks 71 from their assembled position, whereupon the entire combined bearing may be lifted out of the pot through top opening 26, the diameter of flange 67 being such that it will have a sliding fit with lugs 69 of centering ring 70. If plate 197 is blocked up from below on a shaft flange that will pass through the lower opening in the pot, the plate 197 may be raised with the bearing unit after removing the bolts from the retaining ring 197'. If preferred, however, plate 197 may be removed and then the entire shaft with its flange and the bearing unit as a whole may be raised out of the pot.

Should it be desired to remove the radial bearing elements laterally through manhole 28, it is necessary to first remove wedge blocks 71 and then to unbolt lower flange 176 of thrust bearing shell 67 from top webs 185 of the strut elements. The radial bearing assembly may then be rotated until lugs 68 are out of alignment with lugs 69. If the bolts holding the two halves of the journal bearing together are then removed, each half may be moved laterally, or radially with respect to shaft 21, without any lifting or lowering of the parts. If the tubes of the viscosity pumping means 110 are not located at the joint of the radial bearing, upper and outer telescoping tube elements 225 must first be removed by removing bolts or screws 226 and lifting the outer pipe elements off of the outlet tubes 113 from the viscosity pump.

To remove runner 36 and shoes 42, or shoes 42 alone, through manhole 28, substantially the same procedure is followed as that described previously in connection with the embodiment shown in Figs. 6 and 7. The present embodiment, however, affords an additional advantage in that by removing bolts 217 which attach shoe cages 166 to base ring 167 and inserting said bolts in the holes provided in lip or flange 218 so as to connect the cages to the bottom webs of the strut elements, and by removing the bolts which unite the two halves of the journal bearing and the runner, the combined thrust and radial bearing may be removed radially of shaft 21 in unitary halves, it being understood that it is first necessary to remove wedge blocks 71 and to rotate the assembly until lugs 68 are clear of lugs 69.

In the embodiment shown in Fig. 9, there is disclosed a spherical thrust bearing which is adapted to be used interchangeably with the combined thrust and radial bearing of Fig. 8, the parts of the spherical thrust bearing having the same overall dimensions as those of the plane bearing and so constructed as to fit in the same pot or housing. As shown, a thrust block 227 is secured to rotor 22 by the usual bolts 31 and has attached thereto at its conically formed under face, as by bolts and dowels 228 and 229, a thrust collar or runner 230 which is provided with a convex spherically curved bearing surface 231. Runner 230 is preferably formed in halves which may be secured together by suitable bolts indicated at 232. A stationary bearing member comprising a plurality of tiltably mounted bearing shoes 233 is provided with a correspondingly concave spherical bearing surface 234 mating and cooperating with bearing surface 231 of runner 230. Bearing shoes 233 may be suitably mounted by means of spherically faced inserts 235 mounted in the bottoms of said shoes which in turn engage suitably surfaced inserts 236 which are housed in suitable recesses formed in base ring 237. Base ring 237 may be of any suitable construction and is mounted on and secured to supporting deck 168 of the pot as by suitable dowels 238 which pass through a flange 239 formed on the base ring 237. Base ring 237 is also preferably clamped in position to prevent lateral or radial displacement, and for this purpose wedge blocks 71 may be interposed between the periphery of flange 239 and suitable lugs 240 formed integrally with supporting deck 168, said wedge blocks being secured to said deck by bolts or screws 72. It is to be noted that the wedge blocks and bolts used are the same ones as shown in Fig. 8 where they are used for clamping the journal bearing in place. If it is desirable to remove the bearing elements without draining the pot, wedge blocks 71 should not be used, and in this event the lugs 240 may be so shaped and located as to fit the periphery of flange 239 similarly as flange 67 may fit the centering ring 70.

The shoes 233 are maintained in their proper lateral or radial positions by means of a shoe retaining band or ring 241 which surrounds the outer peripheries of the shoes, or individual straps could be used. Retaining band 241 is preferably made in halves bolted together as indicated at 242, and rests upon and is secured to base ring 237 by bolts or screws 243. Retaining band 241 also supports a baffle member 244 secured thereto as by bolts or screws 245 which closely surrounds the outer peripheries of runner 230 and the flange 246 of thrust block 227 through which bolts 228 and dowels 229 pass. An air seal ring 247 of any suitable construction is also supported by baffle 244 closely surrounding a portion of the periphery of runner 230 adjacent the normal oil level to prevent the churning of the oil at this point during normal operation of the bearing. The top of baffle 244 is provided with an inwardly turned collar 248 which overhangs a flange 249 projecting from flange 246 of thrust block 227.

With this construction, it is possible to lift the entire spherical bearing as a unit either with or independently of shaft 21 and to lift it completely out of pot 23 through top opening 26. This operation is possible since runner 230 is securely bolted to thrust block 227 by bolts 228, and because when said thrust block is lifted flange 249 engages collar 248 and through the rigid connection of baffle 244, retaining band 241 and thrust base ring 237, the entire weight of all of the thrust bearing elements is supported by flange 246 of the thrust block. In order to guide the parts during this vertical movement, retaining band 241 is provided with a suitable key 211 adapted to engage a corresponding keyway 212 formed in guiding member 213 which is integral with the wall of pot 23, these elements being similar to those shown in the embodiment of Figs. 6 and 7.

The bearing elements may also be withdrawn from the pot through manholes 28 either individually or in unitary sections, as desired, and in a manner similar to that already described in connection with the preceding embodiments of the invention.

Referring now to Figs. 10 and 11, the combined thrust and radial bearing therein disclosed is substantially the same as that shown in Fig. 4 with the exception that the construction of the pot has been modified to include the novel reversible bath cooling system employing permanent cooler casings and removable cooling units as already described in connection with the embodiment of Figs. 1 and 2.

As shown, the combined thrust and radial bearing comprising thrust block 30, flange 33, runner 36, shoes 42, supporting blocks 144, shoe cage 145, retaining ring 151, thrust base ring 141, radial bearing shell 65 and radial bearing member 66 are mounted in pot 23 secured to the supporting beams or girders 25 as heretofore disclosed. The top of pot 23 extends only slightly above flange 33 of thrust block 30 and does not enclose the radial bearing shell 65 and its enclosed bearing member or members 66. Also, thrust base ring 141 is secured to bottom 59 of the pot from underneath so that the thrust bearing elements may be moved into place and removed from the pot from below. As before the thrust block, runner, cage, radial bearing elements, etc., can be made in halves suitably connected, and, if desired, the structure comprising base ring 141 and cylindrical extensions 148 may also be made in halves suitably bolted together as indicated at 250. In fact the base rings of the various other embodiments disclosed may also be made in halves suitably connected if such is preferred. Also, if the joint between base ring 141 and bottom 59 of pot 23 is not made oil-tight, an additional oil retaining plate 251, which may be made in halves, may be provided underneath the bottom of the pot and form an oil-tight closure, in which case the oil-tight locking wrenches 77 for the jackscrews 76 will be unnecessary. This bearing is assembled and disassembled, and accessible from the side for purposes of adjustment, inspection, replacement and repair in a manner similar to that described in connection with the embodiment of Fig. 4.

The cooler casings 86 are, as shown in Figs. 1 and 2, preferably situated in the corners of pot 23 and cast integrally with the sides thereof. The casings 86 are provided with pipe connections 88 to the viscosity pumping device comprising baffle plate 91 and vertically spaced annular rings 90, and the latter is in turn provided with pipes 95 communicating with the oil well similar to those previously described. Suitable by-pass pipes 96 are also provided connecting the adjacent cooler casings in pairs and the pipes 88 connect the casings to the viscosity pumping ring at points substantially 180° apart.

The cooling units disclosed in Figs. 10 and 11 are also similar to those previously described in connection with Figs. 1 and 2, each comprising a shell 97 secured to a header 101 which supports a bundle of water tubes 102 terminating at their opposite ends in another header 103, the tubes 102 also supporting a plurality of baffles 106 which are adapted to cause the oil to take a circuitous course in passing through shell 97, said shell being provided with a plurality of apertures 107 formed in each end thereof to provide for inlet and outlet of the oil. Each cooling unit is then inserted into casing 86 from the bottom and secured in place by suitable screws 108, or if preferred the arrangement could be inverted and the units inserted into the casings from above. The manner in which the cooling system functions and the advantages incident thereto are the same as already described in connection with the previous embodiment.

Figure 12:
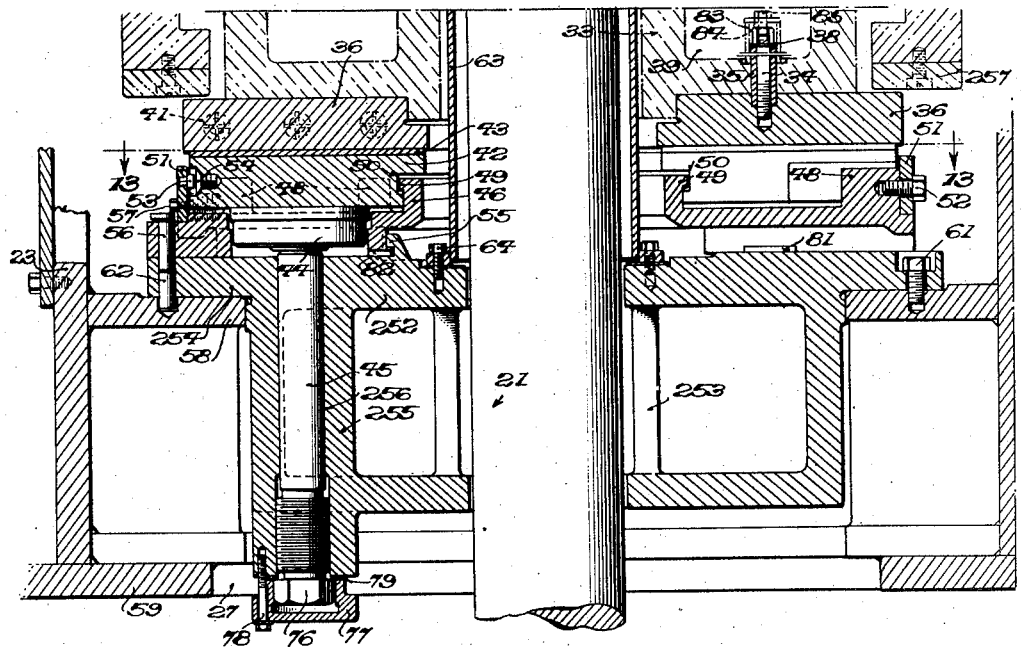
Fig. 12 is an axial section, with certain parts shown in full, of another embodiment of the invention taken on line 12—12 of Fig. 13.
Figure 13:
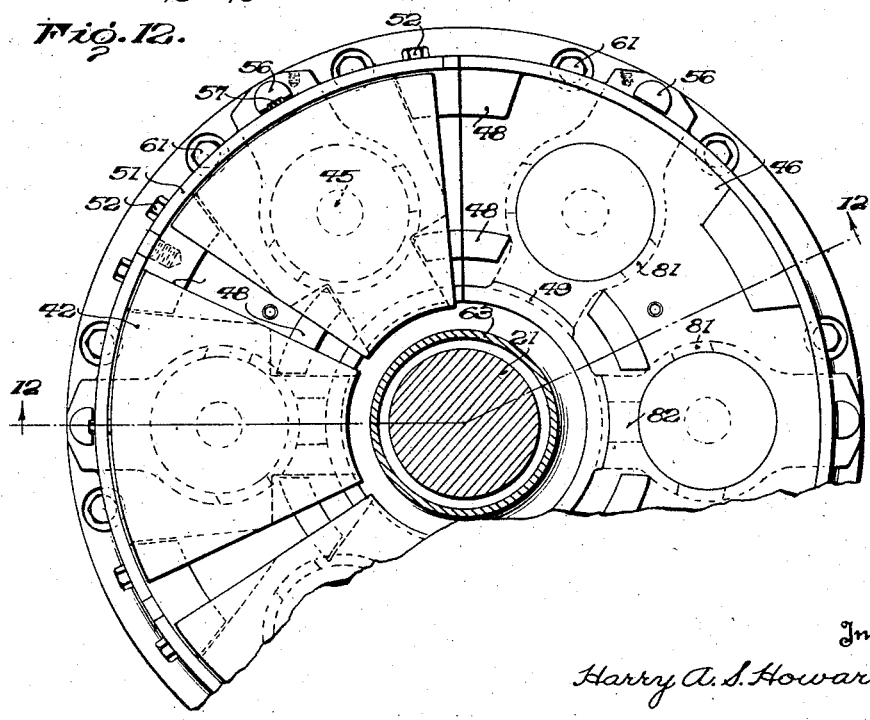
Fig. 13 is a fragmentary horizontal section taken on line 13—13 of Fig. 12.

The construction disclosed in Figs. 12 and 13 is a modification of a portion of the thrust bearing shown in Figs. 1 and 2, the principal change lying in the construction of the base ring whereby a deeper and stiffer base is provided than that previously disclosed. As shown, flange 33 of the thrust block is doweled to runner 36 by tubular dowels comprising dowel bolts 34 and sleeves 35 as previously described, and runner 36 is supported on bearing shoes 42 which are in turn mounted in an annular shoe cage 46 with shoe supports 44 in engagement with thrust pins 45 adjustment of which is provided for by jackscrews 76. Shoes 42, of which there are six in this embodiment, are maintained in their proper radial and circumferential position within cage 46 by means of suitable lugs 48 formed integrally with said cage and by a retaining plate or strap 51 for each shoe secured to lugs 48 of the cage by suitable screws 52. A suitable flange or lip 49 projects radially outwardly from the inner periphery of cage 46 and engages a corresponding vertically elongated recess 50 in the inner periphery of shoe 42, and one or more dowels 53 project inwardly from each plate 51 into enlarged counterbored holes 54 formed in the outer periphery of shoe 42, said lip and dowels permitting a limited vertical movement of the shoe within the cage and yet preventing withdrawal therefrom should the shoe stick to runner 36 while the latter is being lifted. Cage 46 is preferably made in halves, and is supported on and secured to base ring 252 by a holding down clip or flange 55 and a plurality of large-headed, removable dowels 56. If desired, small locking screws 57 may be threaded into plates 51 directly above each dowel 56 to prevent accidental displacement thereof. The cage halves may be bolted together (see Fig. 21) in which event the dowels for one-half of the cage may be omitted. When the cage halves are united the cage can be rotated to bring the shoes in succession to a convenient location or locations for inspection or repair.

In the present embodiment, thrust base ring 252 is made comparatively deep and in the form of a channel, as shown in Fig. 12, suitable stiffening webs 253 being provided as desired between the top and bottom members of said construction. The top of base ring 252 is provided with a peripheral flange or collar 254 which rests upon supporting deck 58 of pot 23, and is secured thereto by suitable bolts or screws 61, and may also be doweled thereto as indicated at 62. At a plurality of peripherally spaced points, each point situated under the center of a shoe support 44, the side member of base ring 252 is enlarged to provide a substantially cylindrical boss 255 having a suitable bore 256 within which is housed a thrust pin 45 and jackscrew 76. The lower ends of bosses 255 project downwardly to approximately the bottom of pot 23, thereby making the adjusting means for shoes 42 accessible from below the bottom of the pot. Suitable locking wrenches 77 may be provided for jackscrews 76, said wrenches having an oil-tight gasket 79 interposed between them and the bottoms of bosses 255 and being secured to the latter by suitable screws or bolts 78.

The structure disclosed in this embodiment is adapted to form part of a combined thrust and radial bearing, or of a thrust bearing alone, which may be housed in a pot 23 similar to those previously described surrounding and supporting a shaft 21, and is adapted for movement as a unit axially with respect to said shaft and radially with respect thereto in unitary sections. As previously described in connection with Figs. 1 and 2, runner 36, shoes 42 and cage 46 may be moved laterally, or radially with respect to shaft 21, in semicircular sections by lifting the thrust block until flange 33 clears the tubular dowels, or by removing said dowels through openings 39, then removing runner bolts 41, cage dowels 56 and any other means securing the halves of said members together, and moving the halves out through the manhole or manholes of the pot. Should runner 36 start to move up with the thrust block, it will be stripped therefrom by an overhanging stripping ring 257 suspended from the radial bearing or other suitable support analogously as in the constructions shown in Figs. 6 and 8, and hence the runner remains in contact with the shoes while the thrust block rises to the required amount for the access desired.

Also, if it is desired only to remove the shoes, or the shoes and cage, suitable means are provided for lifting runner 36 with flange 33 of the thrust block, said means comprising the sleeves 83, washers 84 and screws 85 which cooperate with the tubular dowels in the manner illustrated in the broken lines in Fig. 12. After the runner has been raised off of the shoes, the latter may be removed either individually by removing retaining straps 51, or in groups supported by the halves of cage 46.

Should only one manhole be provided, cage 46 may be rotated on top of base ring 252 after dowels 56 have been removed so as to bring the respective halves of the bearing assembly opposite the manhole through which they can be removed. To facilitate such rotation, suitable circumferential and radial recesses 81 and 82 are provided in the bottom of cage 46 as previously described, and it will be understood that the eccentric shaft and roller arrangement described in connection with the embodiment of Figs. 1 and 2 may also be employed for more easily performing this rotation.

Figure 14:
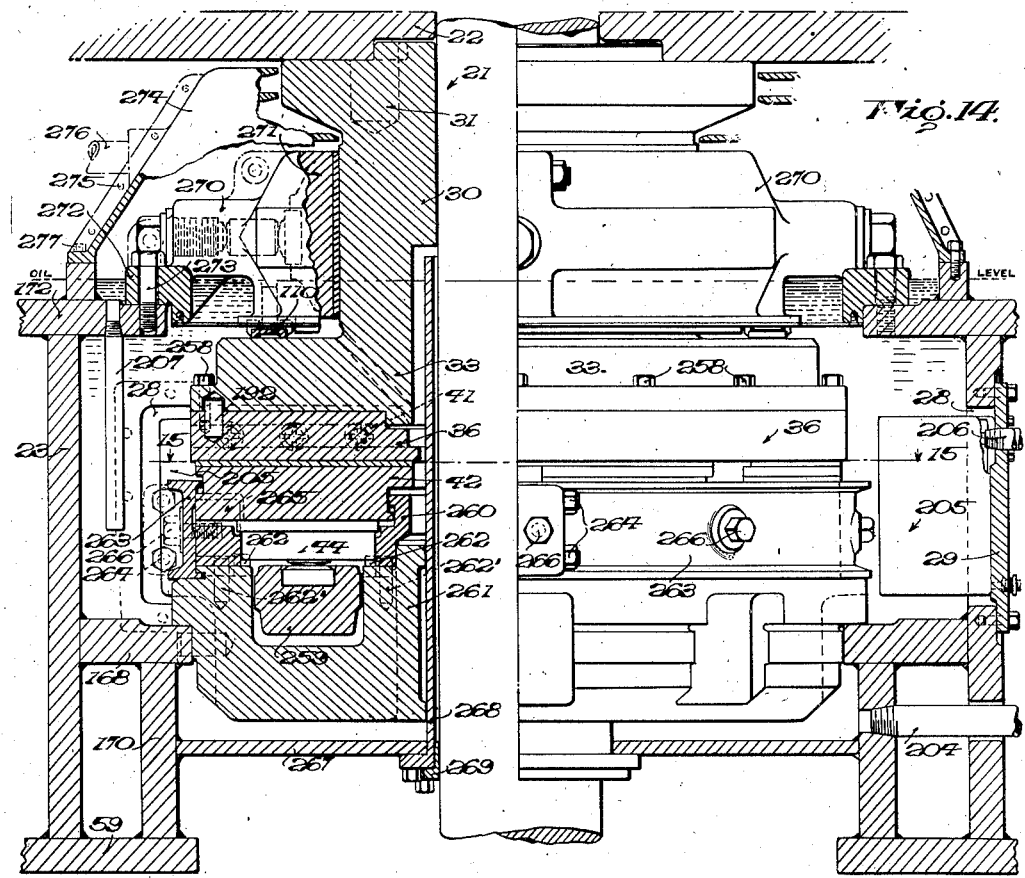
Fig. 14 is an elevation, half in axial section, of another embodiment of the invention, the half axial section being taken on a plane substantially at right angles to the plane of the elevation.
Figure 15:
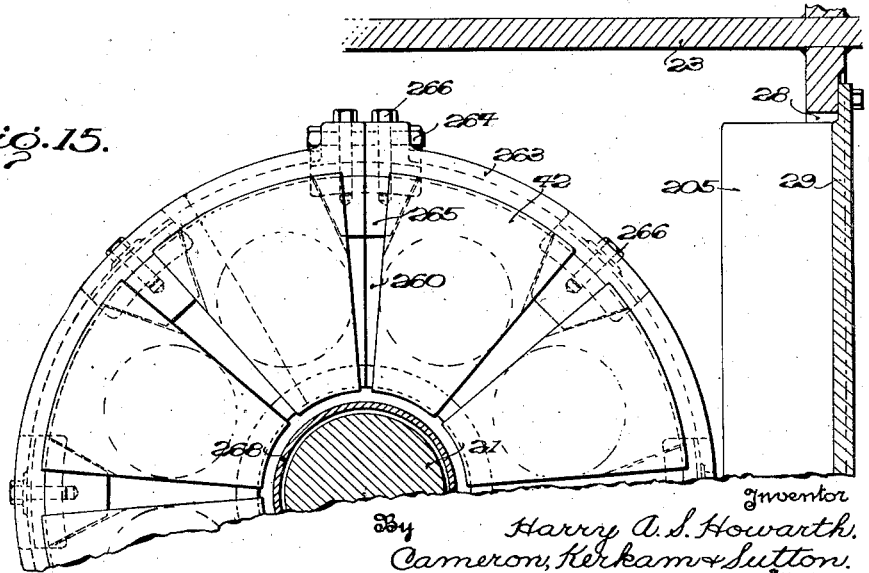
Fig. 15 is a fragmentary horizontal section taken on line 15—15 of Fig. 14.

In Figs. 14 and 15 there is shown a combined thrust and radial bearing with an equalizing means, which bearing is mounted in a manner somewhat similar to that disclosed in Figs. 6 and 7 with the radial bearing, shown as adjustable, supported on the top plate of the pot and surrounded by a removable oil retaining casing, all of the elements of the thrust bearing being supported upon the base ring which rests upon a suitable supporting deck formed in the pot. The thrust bearing elements are substantially the same as those shown in Figs. 6 and 7 with the exception that flange 33 of thrust block 30 is not only doweled to runner 36 as at 192, but is also rigidly secured thereto by suitable bolts or screws 258, thus making runner 36 normally liftable with thrust block 30 unless bolts 258 are removed. Another difference lies in the means for maintaining shoes 42, eight of which are mounted on suitable equalizing plates 259, within the shoe cage.

As shown, the cage 260 is made in halves and is supported by and secured against rotation relative to a heavy base ring 261 by keys 262 held in position by dowels 262′, and is surrounded by a suitable retaining ring or band 263 also made in halves adapted to be secured together as by bolts 264. Band 263 is secured to lugs 265 of cage 260 by suitable bolts or screws 266, and the joint between the halves of said band is located at the joint between the halves of the cage. Thus retaining band 263 when bolted together also holds the cage halves together, and all of the parts are locked upon base ring 261 by dowels 262. If preferred, however, the halves of the cage may also be bolted together.

Base ring 261 is in turn mounted on supporting deck 168 of pot 23, the oil well portion of said pot being completed by a suitable annular bottom plate 267 suitably secured to a vertical stiffening member 170 of the base of pot 23, plate 267 also carrying at its inner periphery closely surrounding shaft 21 an oil retaining sleeve 268 and bored centering ring 269. Oil may be supplied to and drained from the well thus formed by any suitable connection such as shown at 204. If preferred, plate 267 may be detachable from member 170.

The radial bearing elements, consisting primarily of a bearing shell 270 and bearing elements 271 housed therein, are provided with a flange 272 which is supported by and secured to the top plate or member 172 of pot 23 by suitable bolts or screws 273. A suitable casing 274 made in halves adapted to be secured together as indicated at 275 and provided with a vent pipe 276 is also provided surrounding the radial bearing and removably secured to the top of pot 23 as indicated at 277. The provision of casing 274 permits oil to be retained in the space above the top of pot 23 and surrounding the lower portion of the radial bearing, this space above the top of the pot communicating with the main body of the oil well through one or more suitable pipes 207. Oil is also supplied to the radial bearing parts under pressure by a viscosity pump indicated at 110.

Any suitable means may be provided for cooling the oil in the main well, those illustrated comprising a suitable casing 205 mounted on cover plate 29 of manhole 28 and containing any suitable arrangement of cooling coils supplied by pipes 206, similar to the arrangement disclosed in Figs. 6 and 7.

In this form of bearing, as in the embodiment disclosed in Figs. 6 and 7, the radial bearing elements are made in halves and can be assembled and disassembled in the space above the top of pot 23 by simply removing casing 274. The thrust bearing elements, however, may be assembled exteriorly of the pot and lowered into place around shaft 21 as a unit from above, top plate 172 being suitably notched to permit the flanges at the end of the halves of retaining band 263 to pass therethrough. As to accessibility from the side, should it be desirable to remove all of the shoes, it is only necessary to elevate thrust block 30 which, due to bolts 258, will raise runner 36 also, and then by removing retaining band bolts 264, each half of cage 260 and its contained shoes may be moved laterally, or radially with respect to shaft 21, out through manhole 28, after removal of dowels 262. If only one shoe is to be removed, retaining band 263 must not only be unbolted at 264, but bolts 266 which secure said band to cage 260 must also be removed in the half of the band covering the shoe to be removed. After this half of the band has been taken off, individual shoes 42 may be slid out radially from cage 260. Should it be necessary to remove runner 36, also, bolts 258 should be removed first before thrust block 30 is lifted, and then runner bolts 41 must be taken out before the halves of the runner may be removed together with the shoes and cage as previously described.

Referring now to Figs. 21–24, inclusive, there is disclosed therein another form of device for lifting the runner off of the shoes when it is desired to remove the shoes from the thrust bearing assembly independently of the runner. The present device is somewhat similar in its broad conception to the auxiliary lifting blocks 221 described in connection with the embodiment of Figs. 6 and 7, and also performs the same function as the auxiliary sleeves and screws which cooperate with the tubular dowels disclosed in Figs. 1 and 12, but is so constructed as to be capable of use with any of the various embodiments of thrust, or combined thrust and radial, bearings previously disclosed.

In the form shown, the lifting device comprises essentially a pair of jack frames 278 and four jacking blocks 279, two for each frame. Jack frames 278 are adapted to be secured, either permanently or temporarily, to the periphery of the base ring 280 of the thrust bearing by suitable bolts or screws 281, one jack frame being located on each side of the base ring on a diameter at right angles to the line through the manholes 28 of pot 23 through which the bearing elements may be moved for any desired purpose.

Each jack frame 278 consists of, as shown in Figs. 22 and 23, an arcuate plate substantially rectangular in front elevation and provided with a plurality of bolt holes 282 adjacent its bottom edge to receive the bolts 281, a plurality of suitable inwardly extending lugs 283 adapted to rest upon the top of base ring 280, and an inwardly extending overhanging flange 284 at the top of said frame, the extremities of which are formed as substantially cylindrical bosses 285 each of which is provided with an internally threaded bore to receive a jacking bolt 286 later to be described. Jack frame 278 may also be provided with a central opening 287 which will lie on the dividing line between the halves of the shoe cage 288 in which shoes 289 are supported, and may be used as a hand-hole for inspection of or access to the various bearing elements surrounded by the jack frame, and to the bolts 290 which secure retaining plates 291 to shoe cage 288 and hold shoes 289 in their proper radial positions.

Each jacking block 279 comprises a vertical mounting portion 292 having a substantially rectangular cross section with one corner cut out to provide a finished bearing surface 293 in engagement with an upper bearing surface on jack frame 278 and with a lower finished bearing surface 293′ in engagement with a corresponding surface on the frame 278, as shown in the fragmentary section in Fig. 21, thereby providing a pair of axially displaced bearing surfaces for the block on the frame. Mounting portion 292 of jacking block 279 is provided with a vertically elongated slot 294 therethrough which is adapted to receive a suitable bolt 295 which is threaded into frame 278 to secure the jacking block in its operative position. The remainder of jacking block 279 comprises a horizontal lifting portion 296 the inner edge of which is arcuate in shape to conform to the periphery of the runner 297 of the bearing and is provided with a projecting flange 298 which is adapted to engage a suitable groove 299 formed in the periphery of runner 297. Flange 298 is provided with a beveled top surface and a plane bottom surface, as is also groove 299 (see Fig. 24), and the vertical extent of groove 299 is made sufficiently greater than that of flange 298 to permit ready engagement and disengagement of these two elements. Horizontal lifting portion 296 of the jacking block 279 is also provided with a suitable vertical bore 300 which, when jacking block is secured in operative position, is aligned with the threaded bore of boss 285 of jack frame 278, and is adapted to receive jacking bolt 286 which is inserted from below and threaded into boss 285.

In using the lifting device thus constituted, jack frames 278, if not already in place, are secured to base ring 280 by bolts 281 in their proper diametrically opposite positions 90° from the direction in which the shoes are to be removed. The thrust load is then removed from shoes 289 either by lowering the jackscrews and thrust pins where the shoes are adjusted from below, or by raising the thrust block off of the runner. The four jacking blocks 279 are then slipped into place with flanges 298 engaging grooves 299, and are secured to frame 278 by bolts 295. Jacking bolts 286 are then inserted into bores 300 of jacking blocks 279 and threaded into bosses 285 of frames 278. Runner 297 may then be lifted off of shoes 289 by screwing up jacking bolts 286, jacking blocks 279 sliding vertically relatively to frames 278 by virtue of elongated slots 294, but being properly guided by reason of the finished bearing surfaces 293 and 293' heretofore described. When runner 297 has been sufficiently elevated, shoes 289 and shoe cage 288 may be manipulated in any desired manner as described in connection with previous embodiments of the invention, runner 297 being maintained in its lifted position as long as desired. When the shoe and cage elements have been reassembled, runner 297 may be lowered to its operative position and jacking blocks 279 removed so as not to interfere with rotation of the runner.

It is to be noted that no parts of jack frames 278 project over or interfere with the operation of runner 297, and they may therefore be permanently left in place secured to base ring 280, if so desired. Also, with jacking blocks 279 removed, there is nothing to interfere with removal of the halves of runner 297 after its joint bolts have been removed.

Fig. 21 also illustrates at 301 how the shoe cage may be made in halves and joined by bolts, a construction which may be employed in other embodiments shown in the drawings.

Figure 25:
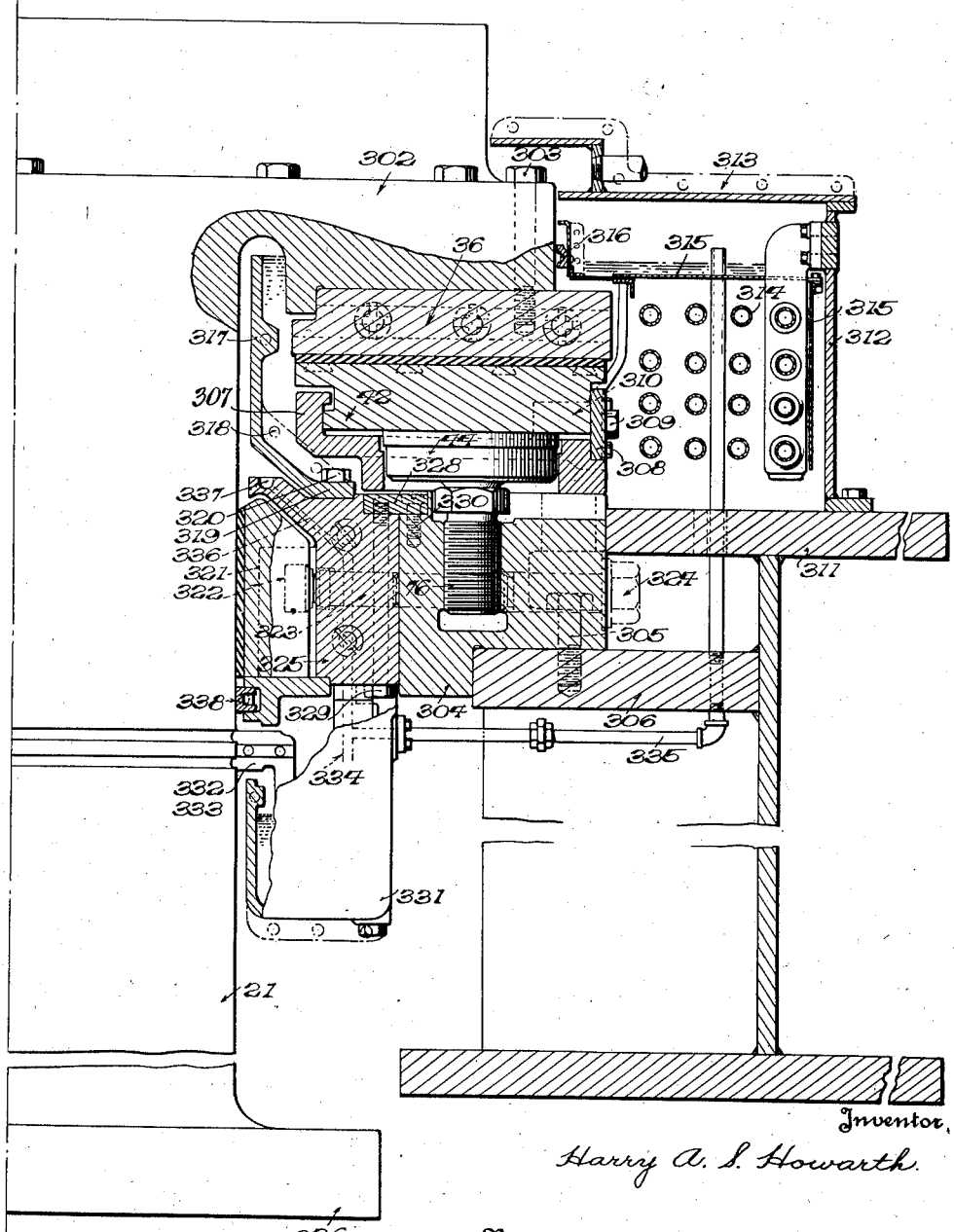
Fig. 25 is a half elevation partly in section of another embodiment of the present invention.

Another embodiment of the invention is illustrated in Fig. 25, wherein the shaft 21 is shown as provided with an integral flange 302 which serves as a thrust block and carrying in any suitable way, as by bolts 303, a runner 36, which may be made in halves as indicated. Cooperating with the runner is a suitable stationary bearing member, here shown as composed of a plurality of shoes 42 as in the earlier described embodiments, mounted on blocks 44 which are in turn carried by the heads of adjustable jack screws 76 threaded into a relatively heavy stiff base ring 304 suitably attached, as by bolts or screws 305, to a deck 306 which may be the bottom wall or an intermediate wall in an oil pot of the character heretofore described, or it may be a horizontal element in the supporting structure as illustrated. The shoes are carried by a cage 307 which is preferably made in halves and which may be of the construction heretofore disclosed, and the shoes are retained in the cage by straps 308, or a split retaining ring, suitably secured in place as by bolts 309 which extend into the lugs 310.

In this embodiment the oil well or pot is shown as disposed above the upper flange 311 of the supporting structure and composed of a housing 312 which is preferably made in halves as indicated at 313 and which may contain a cooling coil 314 and baffle plates 315, together with an air seal ring 316, as illustrated more or less diagrammatically. The inner wall of the oil well or pot is provided by a cylindrical or tubular member 317 which may be made in halves and suitably secured together as indicated at 318 and which is flanged as shown at 319 so that it may be suitably secured, as by screws or bolts 320, to a part of the structure hereinafter referred to.

The present embodiment illustrates the radial bearing as disposed below the thrust bearing, instead of above the same as in earlier embodiments described, and particularly brings out two features, heretofore alluded to, i. e. an adjustable radial bearing with the adjusting means carried from the thrust block, and a thrust block having an enlarged bore so that a flanged shaft may pass therethrough, with or without the elements of the thrust and radial bearings carried therewith.

As here shown, the radial bearing is composed of a plurality of tiltable shoes 321 provided in their rear faces with blocks 322 which have spherical surfaces of contact with thrust pins 323 and are adjustable by means of jack screws 324 threaded into the base ring and disposed below the oil well or pot, where said screws may be readily accessible through suitable openings or manholes provided in the supporting framework or structure. Where, as illustrated, the elements of the radial bearing are designed to be assembled around the shaft and then moved into the stationary bearing structure axially of the shaft, from above in the embodiment illustrated, the shoes 321 are mounted in a shell or sleeve 325 which may be made in halves and suitably connected by bolts or screws as illustrated.

The bore of the base ring 304 is made relatively large so as to permit the passage of the flange 326 of the shaft therethrough, and the shell or cage 325 is provided with a close fit in the bore of said base ring. The shell or cage 325 may be retained in the bore of the base ring 304 in any suitable way as by a ring 328, which may be split if desired, suitably attached to the cage 325 and the base ring 304 as by bolts or screws 329 and 330, respectively. Each thrust pin 323 is made in two sections which meet at the surface of engagement between the cage 325 and base ring 304, as illustrated, so that the section carried by the cage may be moved into and out of alignment with the section carried by the base ring.

Any suitable means may be provided for lubricating the radial bearing. In the form shown, the cage or shell 325 carries a depending pan or pump casing 331 which is preferably made in halves, and rotatably attached to the shaft at 332 is a pump impeller ring 333 which is also preferably made in halves and depends into the casing 331. Said ring may be of any suitable form, such for example as illustrated in my Patent No. 1,760,904, granted June 3, 1930, for Bearings. Oil is delivered by the pump impeller ring to a suitable passage 334 which is branched, one branch leading through pipe 335 to an outlet above the surface of the oil in a housing 312 and the other leading through a restricted outlet passage 336 to a suitable groove 337 formed in the upper surface of a flange on the cage or shell 325. Oil overflows from the groove 337 and lubricates the radial bearing 321, and is collected by an oil retaining ring 338, also preferably made in halves, and returned to the pump casing 331 in any suitable way. The amount of oil delivered by the impeller ring is more than sufficient to pass through the constricted passage 336, and therefore the surplus oil flows through the pipe 335 and overflows into the oil well. It will be noted that the upper edge of the inner oil retaining ring 317 is at the level of the designed surface for the oil in the oil well when the bearing is in operation, and therefore if an excess of oil is pumped from the pump casing 331 into the main body of oil in the oil well, oil will overflow the inner oil retaining ring 317, and flow down the shaft to aid in the lubrication of the radial bearing and maintain the desired quantity of oil in the pump casing 331.

From the foregoing it will be seen that the bore of the thrust block 304 is such as to permit the flange 326 of the shaft 21 to pass freely through the same. Moreover, it will also be observed that the component parts of the radial bearing and its lubricating system are all made in halves, so that they may be assembled around the shaft and introduced into the thrust block with the shaft, axially of the same. If it is desired to raise the shaft for any reason, or to dismantle the bearing structure, the sections of the housing 312 may be removed, after the oil has been drained from the oil well, and then the shoe cage 307 with the shoes 42 and blocks 44 carried thereby may be withdrawn radially from the bearing, in groups composed of a cage half and the shoes carried thereby. The runner 36 may also be withdrawn in sections if preferred, or it can be left attached to the flange 302 of the shaft. Having removed the screws 330 and blocked up the pump casing 331 from the flange 326, the shaft with the elements of the radial bearing and its oiling system and the inner oil retaining ring 317 carried by the shell or cage 325, may be passed axially upward as a unit through the enlarged bore of the base ring 304. It will, furthermore, be noted that as in earlier embodiments the shoes may be severally withdrawn after the load is removed therefrom for inspection or repair, or the shoes may be withdrawn in groups by radial withdrawal of the half cages. Also, the runner may be withdrawn in halves if necessary.

If preferred, the jackscrews may be inverted so as to render them readily accessible and adjustable from below as in earlier embodiments described, and other features of earlier embodiments may be incorporated in this construction, as will be apparent to those skilled in the art. It will, furthermore, be perceived that in this embodiment the elements of the radial bearing are readily accessible for adjustment and the adjusting means is unitarily carried by the thrust block so that, particularly if the jackscrews 76 are inverted as in earlier embodiments, all elements of the thrust and radial bearing can be readily adjusted from below.

It will be perceived from the preceding description that there is thus provided by the present invention an improved thrust, or combined thrust and radial, bearing which is characterized by its high degree of accessibility when in place for purposes of inspection, adjustment, removal and repair of its respective elements, and which may be assembled and disassembled with ease and efficiency. The bearings herein disclosed are adapted to be housed in a pot or well of unitary construction permanently secured in place to the structure supporting the machine with which the bearing is to be used, and the construction of these bearings is such that they may be raised or lowered as a unit into place in their housing pot, and once in place are accessible through the sides of the pot for any desired purpose.

Novel means have been provided for adjusting the elements of such a bearing from outside of its supporting pot thereby avoiding laborious and time wasting procedure. Novel means have also been provided whereby the combined thrust and radial bearing assembly may be raised as a unit with the shaft without separation of the thrust bearing surfaces, or sliding of the radial bearing surfaces. The radial bearing elements may be so mounted as to be removable laterally, or radially with respect to the shaft, either in unitary sections with the elements of the thrust bearing or independently thereof. Maximum flexibility has also been provided for in the manner in which the various elements of the thrust bearing itself may be removed for inspection, replacement or repair, both the shoes and runner being capable of disassembly either independently of one another or in unitary sections. Individual shoes may also be removed from the assembly due to the novel construction of the shoe cage and other elements. The present invention also enables the use of deep stiff base rings which prevent deflection of the bearing elements under heavy loads, which base rings may be so constructed as to permit adjustment of the bearing elements from below. Furthermore the invention facilitates the standardization of the bearings, permitting interchangeable use of spherical or plane bearings, and various forms of pressure equalizing devices, without changing the construction of the pot and other elements of the assembly.

The invention also embodies novel means for forming a strong but compactly arranged oil well which may be furnished as a unit by the bearing manufacturer and which is so constructed as to afford a strong stiff support for the bearing elements. Also, a novel lubricating system is provided embodying oil cooler units insertable from above or below into casings within the bearing pot and a reversible oil circulation system through the coolers actuated by viscosity pump means cooperating with the periphery of the rotatable parts of the thrust bearing. The radial bearing elements may also be lubricated by means of the oil provided for the thrust bearing and forced to the radial bearing under pressure. These various improvements cooperate to provide a highly efficient bearing which can be readily assembled and serviced.

While a number of embodiments of the invention have been shown and described in detail, it is to be expressly understood that the illustrated embodiments are not exclusive, as various other embodiments will now readily suggest themselves to those skilled in the art, while changes may be made in the details of construction, arrangement and proportion of parts, and certain features used without other features, without departing from the spirit of the invention. Features, which have been shown only in conjunction with certain embodiments, may be combined with features shown in other embodiments, while various features may be used independently, all of which will be readily apparent to those skilled in the art. While in the majority of the embodiments disclosed the invention has been shown as applied to combined thrust and radial bearings, it is to be expressly understood that the invention is equally applicable to thrust bearings per se, either plane or spherical. It will also be understood that the invention is not limited to bearings of the shoe, or Kingsbury, type, but that various of its features may be embodied in any form of thrust bearing. Also while the radial bearings have been shown as of the surface or shoe type, other forms of guide or journal bearings, as ball or roller bearings, may be used in many cases, and the term radial bearings is intended to embrace such form of bearings where suitable. Reference is therefore to be had to the appended claims for a definition of the limits of the invention.

What is claimed is:

1. In apparatus of the class described, a shaft, a housing pot, a thrust bearing therein for said shaft including a thrust block, bearing members cooperating therewith and a base member, a radial bearing for said shaft adjacent said thrust bearing, and detachable means for uniting the elements of both of said thrust bearing and said radial bearing with a common support whereby said bearings may be lifted as a unit axially of said shaft and out of said pot.

2. In apparatus of the class described, a shaft, a housing pot, a thrust bearing therein for said shaft including a thrust block, bearing members cooperating therewith, and a base member, a radial bearing for said shaft adjacent said thrust bearing, and means for uniting said thrust bearing elements and said radial bearing into a unit with one of the elements of said thrust bearing whereby said bearings may be moved as a unit axially of said shaft and out of said pot.

3. In apparatus of the class described, a shaft, a housing pot, a thrust bearing therein for said shaft including a thrust block, bearing members cooperating therewith and a base ring, a radial bearing for said shaft adjacent said thrust bearing, and means for uniting said thrust block and bearing members and said radial bearing into a unit with said base ring whereby said bearings may be moved as a unit axially with respect to said shaft and out of said pot.

4. In apparatus of the class described, a shaft, a thrust bearing for said shaft including a thrust block, bearing members cooperating therewith and a base ring, a radial bearing for said shaft adjacent said thrust bearing, and means for supporting said bearing members and base ring and said radial bearing from said thrust block whereby said bearings may be moved as a unit axially with respect to said shaft.

5. In combination, a shaft, a thrust bearing for said shaft, a radial bearing for said shaft adjacent said thrust bearing, a housing pot providing an oil well for said bearings, means for supporting said bearings in said pot, and means for connecting all of the elements of both of said bearings into a unit supported from one of the elements of said thrust bearing whereby said bearings may be displaced as a unit axially with respect to said shaft and into and out of said pot.

6. In combination, a shaft, a thrust bearing for said shaft including a base ring, a radial bearing for said shaft adjacent said thrust bearing, a housing pot providing an oil well for said bearings, means for supporting said bearings in said pot, and means for connecting all of the elements of both said bearings into a unit supported from said base ring whereby said bearings may be displaced as a unit axially with respect to said shaft and into and out of said pot.

7. In combination, a shaft, a thrust bearing for said shaft including a thrust block, a radial bearing for said shaft adjacent said thrust bearing, a housing pot providing an oil well for said bearings, means for supporting said bearings in said pot, and means for supporting all of the elements of both of said bearings from said thrust block whereby said bearings may be displaced as a unit axially with respect to said shaft and into and out of said pot.

8. In a thrust bearing for a vertical shaft, a thrust block, a runner adjacent the lower face of said thrust block, means operatively connecting said thrust block and runner for rotation together but permitting relative axial movement, a bearing member on which said runner bears, and means for optionally connecting said thrust block and runner rigidly whereby they may be moved vertically as a unit with respect to said member.

9. A combined thrust and radial bearing for a shaft composed of sections each of which includes bearing members and supporting means therefor, said sections forming units, mounting means therefor permitting radial displacement of said sections as units with respect to said shaft, and a housing having an opening through which each unit may be moved in a radial direction.

10. A combined thrust and radial bearing for a shaft including means for separating the elements of said combined bearing into a plurality of sectional units circumferentially of said shaft, means supporting said units whereby each unit may be moved radially with respect to said shaft, and an enclosing housing having an opening in its circumferential wall through which said units may be moved in a radial direction.

11. In combination, a vertical shaft, a thrust bearing for said shaft comprising a plurality of circumferential units, a radial bearing for said shaft adjacent said thrust bearing, a housing pot for said bearings provided with a radial opening in its circumferential wall and including means for supporting said bearings therein, and means supporting said units whereby they may be removed in sections radially through the opening of said pot.

12. In combination, a vertical shaft, a thrust bearing for said shaft, a radial bearing for said shaft adjacent said thrust bearing, each of said bearings being divisible into a plurality of sections circumferentially of said shaft, a housing pot for said bearings having a radial opening in its circumferential wall and including means for supporting said bearings therein, supporting means for the sections of said radial bearing permitting radial removal thereof and supporting means for the sections of said thrust bearing whereby the individual sections of said thrust bearing may be removed from said pot radially through said opening.

13. In combination, a vertical shaft, a thrust bearing for said shaft, said bearing being divisible into a plurality of sections circumferentially of said shaft, a housing pot for said bearing provided with an opening in its circumferential wall and including means for supporting said bearing therein, and means whereby the individual sections of said thrust bearing may be rotated into alignment with said opening and removed from said pot radially through said opening.

14. In combination, a vertical shaft, a thrust bearing for said shaft including a thrust block, a runner adjacent the lower face of said thrust block, means operatively connecting said thrust block and runner for rotation together, and bearing shoes on which said runner bears, a housing pot for said bearing, an opening in the side of said pot, and means for supporting said shoes in said pot, said bearing parts being separable into units and said shoes being radially removable through said opening for inspection, replacement and repairs.

15. In combination, a vertical shaft, a thrust bearing for said shaft including a thrust block, a runner adjacent the lower face of said thrust block, means operatively connecting said thrust block and runner for rotation together, a plurality of bearing shoes on which said runner bears, a sectional cage in which said shoes are supported, a housing pot for said bearing, means for supporting said bearing in said pot, and an opening in the side of said pot, said bearing parts being separable into units and the sections of said cage and the supported shoes being radially removable as units through said opening.

16. In combination, a vertical shaft, a thrust bearing for said shaft including a thrust block, a sectional runner adjacent the lower face of said thrust block, means operatively connecting said thrust block and runner for rotation together, a plurality of bearing shoes on which said runner bears, a sectional cage in which said shoes are supported, a thrust base ring supporting said cage, a housing pot for said bearing, and an opening in the side of said pot, said bearing parts being separable into units and the sections of said runner, said cage and the supported shoes being radially removable through said opening as units.

17. In combination, a vertical shaft, a thrust bearing for said shaft including a thrust block, a sectional runner, bearing shoes and a sectional supporting cage for said shoes, said thrust block being liftable independently of said runner and shoes, a housing pot for said bearing provided with an opening, and means supporting said cage sections whereby they may be rotated into alignment with said opening and said runner and shoes may be removed from said pot radially with respect to said shaft when said thrust block is lifted therefrom.

18. In combination, a vertical shaft, a thrust bearing for said shaft including a thrust block, bearing shoes and a cage for said shoes, said cage being made in a plurality of sections, a housing pot for said bearing, and means forming units of said cage sections with the bearing shoes supported thereby whereby said units may be removed from the pot radially with respect to said shaft.

19. In combination, a vertical shaft, a thrust bearing for said shaft including a thrust block, a sectional runner adjacent the lower face of said thrust block and operatively connected thereto for rotation therewith, a plurality of bearing shoes on which said runner bears, a sectional cage for said shoes, a base ring on which said cage is supported, a housing pot for said bearing, and means forming units of said runner, shoes and cage sections whereby they may be removed in sectional units from said pot radially with respect to said shaft and independently of said thrust block and base ring.

20. In combination, a vertical shaft, a thrust bearing for said shaft including a thrust block, a runner adjacent the lower face of said thrust block and operatively connected thereto for rotation therewith, a plurality of bearing shoes on which said runner bears, a cage for said shoes, a base ring on which said cage is supported, a housing pot for said bearing, an opening in one of the sides of said pot, said runner and cage each being divisible into a plurality of sections, and means forming units of said runner and cage sections and supported shoes whereby said units may be rotated into alignment with said opening and removed from said pot through said opening radially with respect to said shaft.

21. In combination, a thrust bearing for a vertical shaft including a plurality of bearing members, a housing pot including a supporting deck on which said bearing is supported, thrust pins extending vertically through said deck and on which said bearing members are mounted, and jackscrews accessible from the outside of said pot for adjusting said thrust pins and thereby said bearing members.

22. In combination, a thrust bearing including bearing shoes and a base ring upon which said shoes are supported, a housing pot having a supporting deck to which said base ring is secured, a sleeve in alignment with each shoe and extending from said base ring and through said supporting deck, a thrust pin in each sleeve engaging the aligned shoe, and means for adjusting the position of said thrust pins.

23. In combination, a thrust bearing including bearing shoes and a base ring on which said shoes are supported, a housing pot having a supporting deck to which said base ring is secured, a sleeve in alignment with each shoe and extending from said base ring and through said supporting deck, a thrust pin in each sleeve and engaging the aligned shoe, and a jackscrew threaded into each sleeve and accessible from outside of said pot for adjusting the position of said shoes.

24. In combination, a thrust bearing including a bearing shoe and a base ring on which said shoe is supported, a housing pot including means for supporting said base ring therein, a cylindrical portion of said base ring extending downwardly below the bottom of said pot, and means extending through said cylindrical portion and accessible from below the pot for adjusting the position of said shoe.

25. In combination, a thrust bearing including a bearing shoe and a base ring on which said shoe is supported, a housing pot including means for supporting said base ring therein, a cylindrical portion of said base ring extending downwardly below the bottom of said pot, and jackscrew means threaded into the lower end of said cylindrical portion and abutting the bottom of said shoe for adjusting the position of said shoe.

26. In combination, a thrust bearing including a plurality of bearing shoes and a base ring on which said shoes are supported, a housing pot including means for supporting said bearing therein, said pot normally containing a quantity of oil for lubricating said bearings, thrust pins extending through said base ring and engaging said shoes, means accessible from outside said pot for adjusting the position of said thrust pins, and locking means for preventing accidental disturbance of said adjusting means, said locking means also enclosing said adjusting means and being liquid-tight to prevent the escape of oil from said pot.

27. In combination, a thrust bearing including a plurality of bearing shoes and a base ring on which said shoes are supported, a housing pot including means for supporting said bearing therein, said pot normally containing a quantity of oil for lubricating said bearing, thrust pins extending through said base ring and engaging said shoes, jackscrews accessible from outside said pot for adjusting the position of said thrust pins, and locking means enclosing the heads of said jackscrews for preventing accidental disturbance of said adjustment, said locking means also being liquid-tight to prevent the escape of oil from said pot along the threads of said jackscrew means.

28. In combination, a thrust bearing including bearing shoes and a base ring on which said shoes are supported, a housing pot including means for supporting said bearing therein, said pot normally containing a quantity of oil for lubricating said bearing, sleeves extending from said pot in alignment with said shoes, thrust pins in said sleeves engaging said shoes, means accessible from below said pot for adjusting the position of said thrust pins, and common means for locking said adjusting means against accidental disturbance and for closing the ends of said sleeves to prevent the leakage of oil from said pot.

29. In a thrust bearing, the combination of a thrust block, a runner mounted thereon for rotation therewith, a stationary bearing member adapted to cooperate with said runner, supporting means for said stationary bearing member, and means for connecting said thrust block and supporting means whereby they may be moved as a unit.

30. In a thrust bearing, the combination of a thrust block, a runner mounted thereon for rotation therewith, a stationary bearing member adapted to cooperate with said runner, supporting means for said stationary bearing member, means for connecting said thrust block and supporting means whereby they may be moved as a unit, and radial bearing members movable with or detachable from said last named means.

31. In combination, a bearing, a housing pot including means for supporting said bearing therein, said pot also constituting a well normally containing a quantity of oil for lubricating said bearing, a plurality of oil coolers comprising casings within said pot and cooling units insertable into said casings from the exterior of said pot, and means for circulating the oil through said coolers.

32. In combination, a bearing, a housing pot including means for supporting said bearing therein, said pot also constituting a well normally containing a quantity of oil for lubricating said bearing, a plurality of oil coolers comprising casings within said pot and cooling units insertable into said casings from the exterior of said pot, conduits connecting the interiors of said casings with said oil well, and means for circulating the oil through said conduits and casings.

33. In combination, a bearing, a housing pot including means for supporting said bearing therein, said pot also constituting a well normally containing a quantity of oil for lubricating said bearing, a plurality of oil coolers comprising casings within said pot and cooling units insertable into said casings from the exterior of said pot, conduits connecting the interiors of said casings with said oil well, and means cooperating with the periphery of a rotatable member of said bearing for circulating the oil through said conduits and casings.

34. In combination, a bearing, a housing pot including means for supporting said bearing therein, said pot also constituting a well normally containing a quantity of oil for lubricating said bearing, a plurality of oil coolers comprising casings within said pot and cooling units insertable into said casings from the exterior of said pot, and viscosity pump means for circulating the oil through said coolers.

35. In combination, a bearing, a housing pot including means for supporting said bearing therein, said pot also constituting a well normally containing a quantity of oil for lubricating said bearing, a plurality of oil coolers comprising casings within said pot and cooling units insertable into said casings from the exterior of said pot, and a reversible pumping system for circulating the oil through said coolers.

36. In combination, a bearing, a housing pot including means for supporting said bearing therein, said pot also constituting a well normally containing a quantity of oil for lubricating said bearing, a plurality of oil coolers comprising casings within said pot and cooling units insertable into said casings from the exterior of said pot, and a reversible pumping system for circulating the oil through said coolers comprising a pumping ring cooperating with the periphery of a rotatable member of said bearing, and conduit connections between said pumping ring, said casings and said oil well.

37. In combination, a bearing, a housing pot including means for supporting said bearing therein, said pot also constituting a well normally containing a quantity of oil for lubricating said bearing, a plurality of oil coolers comprising casings within said pot and cooling units insertable into said casings from the exterior of said pot, conduit means connecting the interior of each casing with that of an adjacent casing, a viscosity pumping ring cooperating with the periphery of a rotatable member of said bearing, conduit means connecting the interior of each casing with said pumping ring, and conduit means connecting said pumping ring with said oil well.

38. In a lubricating system for a bearing, an oil supply, a plurality of oil coolers, a reversible pumping ring cooperating with the periphery of a rotatable member of the bearing and having a plurality of pumping segments corresponding in number to the number of coolers, conduit means connecting each cooler to one of said pumping segments of said pumping ring, conduit means connecting each of said segments with said oil supply, and conduit means connecting each cooler with an adjacent cooler whereby the oil is circulated by said pumping ring through two coolers in series before being returned to said supply.

39. In a lubricating system for a bearing, an oil supply, a plurality of oil coolers, a viscosity pumping ring associated with said bearing and having a plurality of pumping segments corresponding in number to the number of coolers, and conduit means interconnecting said coolers, pumping segments and oil supply so constructed and arranged that oil taken from said supply is pumped through a plurality of said pumping segments and coolers in series before being returned to said supply.

40. In a lubricating system for a bearing, an oil supply, a plurality of oil coolers, a viscosity pumping ring associated with said bearing and having a plurality of pumping segments corresponding in number to said coolers, and conduit means interconnecting said coolers, pumping segments and oil supply, said system being reversible to withdraw oil from said oil supply and pump it through said coolers in pairs and return it to said oil supply, the inlet cooler for one direction of rotation being the outlet cooler for the opposite direction of rotation.

41. In combination, a bearing, a housing pot including means for supporting said bearing therein, said pot also constituting a well normally containing a quantity of oil for lubricating said bearing, a plurality of oil coolers, conduit means connecting each cooler with an adjacent cooler, a reversible pumping ring cooperating with the periphery of a rotatable member of said bearing and having a plurality of pumping segments corresponding in number to the number of coolers, conduit means connecting each cooler with one of said pumping segments of said pumping ring, and conduit means connnecting each of said segments with said oil well.

42. In combination, a bearing, a housing pot including means for supporting said bearing therein, said pot also constituting a well normally containing a quantity of oil for lubricating said bearing, a plurality of oil coolers comprising casings within said pot and cooling units insertable into said casings from the exterior of said pot, conduit means connecting the interior of each casing with that of an adjacent casing, a reversible pumping ring cooperating with the periphery of a rotatable member of said bearing and having a plurality of pumping segments corresponding in number to the number of coolers, conduit means connecting the interior of each casing with one of said pumping segments of said pumping ring, and conduit means connecting each of said segments with said oil well.

43. In a combined thrust and radial bearing for a vertical shaft, a thrust block rotatable with the shaft, a radial bearing shell associated with the thrust block, a channel shaped lubricating ring resting on a horizontal face of said thrust block, a vertical guiding flange on said ring encircling the periphery of said thrust block, a tube fixed in said journal bearing shell with its lower end in engagement with the upper face of said ring, a plurality of ports in said ring communicating with the chamber formed between said ring and said horizontal face of the thrust block, means for maintaining one of said ports in registry with said tube regardless of the direction of rotation of said shaft, and passages for distributing lubricant from said tube to said radial bearing.

44. In a combined thrust and radial bearing for a vertical shaft, a trust block rotatable with the shaft, a radial bearing shell associated with the thrust block, a channel shaped lubricating ring resting on a horizontal face of said thrust block, a vertical guiding flange on said ring encircling the periphery of said thrust block, a plurality of vertical tubes fixed in said radial bearing shell with their lower ends in engagement with the upper face of said ring, a plurality of dams in said ring forming a number of pumping chambers therein corresponding to the number of said tubes, inlet and outlet ports communicating with each of said pumping chambers, means for maintaining said outlet ports in registry with said tubes regardless of the direction of rotation of said shaft, and passages for distributing lubricant from said tubes to said radial bearing.

45. In a lubricating device for bearings including a vertical shaft, a thrust member thereon, and a viscosity pumping ring cooperating with the periphery of said thrust member and having a plurality of pumping segments all of which are simultaneously active in pumping oil regardless of the direction of rotation.

46. In a lubricating device for a combined thrust and radial bearing, a rotatable thrust bearing member, a viscosity pumping ring cooperating with said member and having a plurality of pumping segments all of which are simultaneously active in pumping oil regardless of the direction of rotation of said member, and centrifugal pumping means cooperating with said viscosity pumping ring to supply lubricant to the radial bearing surfaces.

47. In a thrust bearing having a thrust block, a runner and a stationary bearing member on which said runner normally rests, means independent of said thrust block for moving said runner out of contact with said shoes.

48. In a thrust bearing having a thrust block, a runner and a stationary bearing member with which said runner is normally in engagement, and means independent of said thrust block for moving said runner out of contact with said stationary bearing member including a plurality of jacking blocks having operative engagement with said runner and means for moving said jacking blocks relatively to said stationary bearing member.

49. In a thrust bearing having a runner and a stationary bearing member, means for moving said runner out of contact with said stationary bearing member comprising a fixed member and a jacking block mounted thereon adapted to engage said runner and to be moved relatively to said member.

50. In a thrust bearing, a runner, a stationary bearing member on which said runner normally rests, and means for moving said runner out of contact with said member comprising a plurality of jacking blocks, means for engaging said blocks with said runner, supporting means for said blocks relatively fixed with respect to said member, and means for moving said blocks relatively to said supporting means.

51. In a thrust bearing having a runner and a stationary bearing member with which said runner is normally in engagement, means for moving said runner out of contact with said member comprising a jack frame, a plurality of jacking blocks mounted on said frame and having operative engagement with said runner, and means for moving said jacking blocks with respect to said frame.

52. In a thrust bearing having a runner, a shoe, and a base ring operatively supporting said shoe, means for moving said runner out of contact with said shoe comprising a jack frame, means for securing said frame to said base ring, and a plurality of jacking blocks mounted on said frame and adapted to detachably engage said runner and to be moved relatively to said frame.

53. In a combined thrust and radial bearing, a housing pot, a thrust base ring on which the elements of the thrust bearing are supported therein, a radial bearing casing enclosing the elements of the radial bearing, and means for optionally connecting said radial bearing casing with said thrust base ring whereby the combined bearing may be moved as a unit into and out of said pot.

54. In a combined thrust and radial bearing, a thrust base ring on which the elements of the thrust bearing are supported, a radial bearing casing enclosing the elements of the radial bearing, and means rigidly connecting said radial bearing casing with said thrust base ring whereby the combined bearing may be moved as a unit, said means including a member having a pair of spaced arcuate webs and a plurality of struts secured therebetween, said webs being detachably connected to said radial bearing casing and thrust base ring, respectively.

55. In a thrust bearing, a thrust base ring on which the elements of the thrust bearing are supported, a thrust block, and means connecting said thrust block with said thrust base ring whereby the bearing may be moved as a unit, said means including guiding members for guiding the movement of said bearing in a predetermined path.

56. In a combined thrust and radial bearing, a thrust base ring on which the elements of the thrust bearing are supported, a radial bearing casing enclosing the elements of the radial bearing, a strutted member rigidly connecting said radial bearing casing with said thrust base ring whereby the combined bearing may be moved as a unit, and means for guiding said movement of the combined bearing in a predetermined path.

57. In combination, a shaft, a thrust bearing for said shaft including a thrust block, bearing members and a base ring, and means normally connected with said base ring and including a member having operative engagement with said thrust block whereby said bearing may be moved as a unit axially of said shaft.

58. In combination, a shaft, a thrust bearing for said shaft including a thrust block, bearing members and a base ring, a radial bearing for said shaft adjacent said thrust bearing including a radial bearing casing, a lifting member detachably secured to said radial bearing casing and having operative engagement with said thrust block, and a strut element normally connecting said radial bearing casing with said base ring whereby both of said bearings may be moved as a unit axially of said shaft.

59. In combination, a shaft, a thrust bearing for said shaft including a thrust block, bearing members and a base ring, a lifting member having operative engagement with said thrust block, and a strut element rigidly connecting said lifting member with said base ring whereby said bearing may be moved as a unit axially of said shaft.

60. In a thrust bearing for a vertical shaft, a thrust block, a thrust base ring, a lifting member having operative engagement with said thrust block, and a strut element having a pair of vertically spaced arcuate webs and a plurality of vertical struts secured therebetween, said webs being connected to said lifting member and thrust base ring, respectively, whereby said bearing may be supported and lifted as a unit by said thrust block.

61. In combination, a shaft, a thrust bearing for said shaft including a thrust block, bearing members and a base ring, and means connecting said thrust block and base ring for movement as a unit including a plurality of struts operatively secured to said thrust block and base ring, said struts being circumferentially spaced about said bearings and the distance between adjacent struts being sufficient to permit individual withdrawal of said bearing members therebetween.

62. In a thrust bearing, a thrust block, a plurality of bearing shoes, a supporting cage for each shoe, a base ring on which said cages are supported and to which they are removably secured, a member to which a portion of said cages may be temporarily secured, and means for moving said member laterally with respect to said bearing and thereby removing as a unit from the bearing assembly the cages secured thereto and the shoes supported by said cages.

63. In combination, a shaft, a thrust bearing for said shaft including a thrust block, a plurality of bearing members and a base ring, means including a pair of strut elements connecting said thrust block with said base ring, a sectional cage for said bearing members normally secured to said base ring, and means for temporarily disconnecting said cage from said base ring and securing its sections to said strut elements whereby said strut elements may be removed from said bearing assembly together with the attached cage and bearing members supported thereon.

64. In combination, a shaft, a thrust bearing for said shaft including a plurality of bearing shoes and a sectional cage in which said shoes are supported, a housing pot for said bearing, an opening in one side of said pot through which the section of cage adjacent thereto and its supported shoes may be removed radially with respect to said shaft, and means for rotating the remaining sections of the cage and supported shoes with respect to said shaft until they are in position to be removed through said opening.

65. In combination, a shaft, a thrust bearing for said shaft including a plurality of bearing shoes, a sectional cage for said shoes and a base ring to which said cage is normally secured, a radial bearing for said shaft adjacent said thrust bearing including a radial bearing casing, a pair of substantially semicircular members normally connecting said radial bearing casing with said thrust base ring whereby said bearings may be moved as a unit axially of said shaft, a housing pot for said bearing having an opening in one side thereof, means for temporarily disconnecting said cage sections from said base ring and securing the sections to said substantially semicircular members, and means for disconnecting said members from said radial bearing casing and thrust base ring and removing them with the attached cage sections and shoes through said openings radially with respect to said shaft.

66. In a thrust bearing for a vertical shaft, a thrust block, a runner adjacent the lower face of said thrust block and operatively connected thereto for rotation therewith, a bearing member on which said runner bears, and means for stripping said runner from said thrust block when the latter is lifted whereby separation of the bearing surfaces of said runner and bearing member is prevented.

67. In a thrust bearing, a thrust block, a runner adjacent the lower face of said thrust block and operatively connected thereto for rotation therewith, a plurality of bearing shoes on which said runner bears, a cage in which said shoes are supported, means permitting a limited upward movement of said shoes within said cage, and means for stripping said runner from said thrust block when the latter is lifted and before the limit of upward movement of said shoes within said cage is reached whereby separation of the bearing surfaces of said runner and shoes is prevented.

68. In a thrust bearing, a thrust block, a runner carried by said thrust block and having a spherical bearing surface, a plurality of bearing shoes having curved surfaces mating with the bearing surface of said runner, a base ring on which said shoes are mounted, and means rigidly connected with said base ring and adapted for operative engagement with said thrust block when the latter is lifted for effecting movement of the bearing as a unit.

69. In a thrust bearing for a vertical shaft, a thrust block, a runner carried by said thrust block and having a spherical bearing surface, a plurality of bearing shoes having curved surfaces mating with the bearing surface of said runner, a base ring on which said shoes are mounted, a flange on said thrust block, and a member in rigid assembly with said base ring having a collar overhanging said flange whereby the bearing may be supported and lifted as a unit by said thrust block.

70. In a combined thrust and radial bearing, the combination of thrust bearing members including a base ring for receiving the thrust, radial bearing members, and radially extending means mounted in said base ring for adjusting said radial bearing members.

71. In a combined thrust and radial bearing, the combination of thrust bearing members including a base ring for receiving the thrust, radial bearing members mounted in said base ring below said thrust bearing members, and means mounted in said base ring and extending radially therethrough to the exterior thereof for adjusting said radial bearing members.

72. In a thrust bearing, the combination of a shaft carrying a flange, a base ring having a relatively large bore adapted to pass said flange when said shaft and flange are lifted, and bearing members mounted within the bore of said base ring and adapted to be supported on said flange for movement into and out of operative position with said shaft.

73. In a combined thrust and radial bearing, a shaft having a flange, thrust bearing members including a base ring having a relatively large bore adapted to pass said flange when said shaft and flange are lifted, radial bearing members mounted within said bore and adapted to be supported on said flange for movement into and out of said bore with said shaft, and oiling means for said radial bearing movable therewith.

74. In a combined thrust and radial bearing, in combination with thrust bearing members, a relatively stiff rigid housing for said thrust bearing members providing an oil pot therefor, said pot having an opening in its bottom into and out of which said thrust bearing members may be moved as a unit and radial bearing members supported on the upper portion of said pot.

75. In a combined thrust and radial bearing, in combination with a thrust block, thrust bearing members cooperating therewith, a relatively stiff rigid housing for said bearing providing an oil pot therefor, said housing having a bottom opening for a shaft, a base member on which said thrust block and said thrust bearing members are adapted to be supported for movement into and out of said pot as a unit through said shaft opening, and radial bearing members supported on the upper portion of said pot for cooperation with said thrust block when said base member is secured to the bottom of said pot.

76. In a thrust bearing, in combination with thrust bearing members, a relatively stiff rigid housing for said bearing members providing an oil pot therefor, a shaft opening in the top of said oil pot, and means for connecting said bearing members into a unit whereby the entire thrust bearing is movable into and out of said oil pot as a unit through said shaft opening.

77. In a thrust bearing, in combination with a thrust bearing and means for securing all of the members thereof into a unit, a relatively stiff rigid unitary oil pot adapted to house said thrust bearing and mountable as a unit on the supporting structure of said bearing, said pot having an axial opening through which said thrust bearing is movable as a unit and a lateral opening for access to said thrust bearing members.

78. In a thrust bearing, in combination with thrust bearing members, a relatively stiff rigid rectangular housing therefor constituting an oil pot for said thrust bearing members and provided with integral casings for cooler units in the corners thereof.

79. In a thrust bearing, in combination with thrust bearing members, a generally rectangular bearing housing constituting an oil pot for said bearing members, and casings for cooler units in the corners of said pot.

80. In a thrust bearing, in combination with thrust bearing members, a generally rectangular bearing housing constituting an oil pot for said bearing members, casings for cooler units in the corners of said pot, and readily detachable cooler units insertable into each of said casings from the exterior of said pot.

81. In a thrust bearing, the combination of a thrust block, a runner mounted thereon for rotation therewith, a plurality of shoes for cooperation with said runner, and a sectional cage for said shoes, the sections of said cage being removable as units with the shoes carried thereby and said shoes being individually removable from said cage.

82. In a thrust bearing, the combination of a thrust block, a runner carried thereby and rotatable therewith, a plurality of shoes cooperating with said runner, a sectional cage for supporting said shoes, said shoes being removable in groups with cage sections, and means for holding said shoes in said cage, said means being removable to permit removal of the shoes singly from said cage.

83. In a thrust bearing, the combination of a thrust block, a sectional runner carried thereby and rotatable therewith, a plurality of shoes cooperating with said runner, and a sectional cage for supporting said shoes, said shoes being removable in groups with the cage sections and said runner sections being removable with said cage sections when detached from said thrust block.

84. In a thrust bearing, the combination of a thrust block, a runner mounted thereon for rotation therewith, a plurality of shoes cooperating with said runner, a sectional cage for supporting said shoes, a base ring on which said cage is mounted, and strut elements movable with said thrust block and normally attached to said base ring.

85. In a thrust bearing, the combination of a thrust block, a runner mounted thereon for rotation therewith, a plurality of shoes cooperating with said runner, a sectional cage for supporting said shoes, a base ring on which said cage is mounted, and strut elements movable with said thrust block and normally attached to said base ring, said strut elements being detachable from said thrust block and base ring and attachable to said cage sections, whereby said cage sections and strut elements may be removed as units with the shoes supported thereon.

86. In a thrust bearing, the combination of a thrust block, a runner mounted thereon for rotation therewith, a plurality of shoes cooperating with said runner, a sectional cage for supporting said shoes, a base ring on which said cage is mounted, and strut elements movable with said thrust block and normally attached to said base ring but detachable therefrom and attachable to said cage sections, said strut elements permitting the removable of said shoes individually from said cage.

87. In a thrust bearing, the combination of a thrust block, a runner mounted thereon for rotation therewith, a stationary bearing member adapted to cooperate with said runner, supporting means for said stationary bearing member, means for connecting said thrust block and supporting means whereby they may be moved as a unit, and means associated with said last named means for stripping said thrust block from said runner before said runner is disengaged from said stationary bearing member.

88. In a thrust bearing, the combination of a thrust block, a runner mounted thereon for rotation therewith, a stationary bearing member adapted to cooperate with said runner, supporting means for said stationary bearing member, means for optionally lifting said supporting means with said thrust block, and adjustable means associated with said last named means for determining whether or not said runner shall become disengaged from said thrust block.

89. In a thrust bearing, the combination of a thrust block, a runner mounted thereon for rotation therewith, a stationary bearing member adapted to cooperate with said runner, supporting means for said stationary bearing member, means for optionally lifting said supporting means with said thrust block, and adjustable means for attaching said runner rigidly to said thrust block.

90. In a thrust bearing, the combination of a thrust block, a runner mounted thereon for rotation therewith, a stationary bearing member adapted to cooperate with said runner, supporting means for said stationary bearing member, lifting means associated with said thrust block, means for connecting said lifting and supporting means whereby they may be moved as a unit, said last named means being detachable from said lifting means and supporting means, and means for connecting said last named means to said stationary bearing member for movement therewith as a unit.

91. In a thrust bearing, a thrust base ring on which the elements of the thrust bearing are supported, a thrust block, and means connecting said thrust block with said thrust base ring whereby the bearing may be moved as a unit.

92. In a combined thrust and radial bearing, a thrust base ring on which the elements of the thrust bearing are supported, a radial bearing casing enclosing the elements of the radial bearing, and a strutted member rigidly connecting said radial bearing casing with said thrust base ring whereby the combined bearing may be moved as a unit.

93. In a lubricating device for bearings including a vertical shaft, a thrust block thereon, a viscosity pumping ring cooperating with a surface of said thrust block and having a plurality of ports therein, said pumping ring being movable with said thrust block through a limited distance, and a tube having an arcuate flange operatively engaged with said pumping ring, said ports being alternatively brought into registry with said tube by movement of said pumping ring in opposite directions.

94. In a lubricating device for bearings including a vertical shaft, a thrust block thereon, a viscosity pumping ring cooperating with a surface of said thrust block and having a plurality of ports therein, said pumping ring having a channel at its rear and movable with said thrust block through a limited distance, and a tube having an arcuate flange engaged in said channel, said ports being alternatively brought into registry with said tube by movement of said pumping ring in opposite directions.

95. In a combined thrust and radial bearing, in combination with thrust bearing members, a housing for said thrust bearing members providing an oil pot therefor, a base ring for said thrust bearing members movable into and out of said pot through the top thereof, and radial bearing members alternatively movable into and out of said pot with said base ring or insertable into said base ring from the bottom thereof.

96. In a combined thrust and radial bearing, in combination with thrust bearing members, a housing for said thrust bearing members providing an oil pot therefor, a base ring for said thrust bearing members movable into and out of said pot through the top thereof, radial bearing members and a shell therefor mounted within the bore of said base ring, and means carried by said base ring and shell for adjusting said radial bearings, said last named means being divisible at the joint between said shell and base ring.

97. In a combined thrust and radial bearing, the combination of a relatively stiff rigid oil pot, a thrust block, thrust bearing members mounted within said pot, a radial bearing means cooperating with said thrust block, and means for rigidly clamping said radial bearing means to the open end of said pot.

98. In a combined thrust and radial bearing, in combination with thrust bearing members, a housing for said thrust bearing members providing an oil pot therefor and having a large top opening through which said thrust bearing members may be lowered as a unit into said housing, radial bearing members associated with said thrust bearing members, and means between said radial bearing members and the open end of said housing for centering said radial bearing members.

99. In a combined thrust and radial bearing, in combination with thrust bearing members including a thrust block, a housing for said thrust bearing members providing an oil pot therefor and having a large opening at the top through which said thrust bearing members may be lowered into said housing as a unit, radial bearing members cooperating with said thrust block and optionally removable with said thrust bearing unit or separately therefrom, and means between the open end of said housing and said radial bearing members for centering the latter.

100. In a combined thrust and radial bearing, the combination of a thrust block, bearing members cooperating therewith, a base member supporting said bearing members, radial bearing members cooperating with said thrust block, and a housing providing an oil pot for said thrust bearing, said thrust bearing elements being movable as a unit into and out of said housing and said radial bearing members being optionally connectible to form a part of said unit or separately removable therefrom.

101. In a thrust bearing, the combination of a thrust block, bearing members cooperating therewith, a base member for supporting said bearing members, a housing providing an oil pot for said thrust bearing, and means interposed between said base member and said thrust block for optionally uniting said thrust bearing elements into a unit for movement into and out of said oil pot.

102. In a thrust bearing, the combination of a thrust block, bearing members cooperating therewith, a base member supporting said bearing members, a housing providing an oil pot for said thrust bearing, means interposed between said base member and said thrust block for optionally uniting said thrust bearing elements into a unit for movement into and out of said oil pot, said bearing members being formed in sections, and means for optionally connecting or disconnecting said sections for individual removal thereof.

103. In a thrust bearing, the combination of a thrust block, a runner detachably connected to said block, stationary bearing members cooperating with said runner, a mounting member for said bearing members, a housing providing an oil pot for said bearing, and means for optionally connecting the thrust block to said runner or said mounting member for removal therewith.

104. In a thrust bearing, the combination of a thrust block, a runner detachably connected to said block, bearing members cooperating with said runner, a mounting member for said bearing members, a housing providing an oil pot for said bearing, and means for optionally connecting said mounting member to said thrust block for movement as a unit therewith, said last named means connectible to said bearing members for removing said bearing members in groups.

105. In a thrust bearing, in combination with a thrust block, bearing members including a plurality of bearing shoes cooperating therewith, a base member on which said bearing shoes are mounted, and a cage for said bearing shoes formed in sections and provided with removable shoe retaining means, whereby said shoes may be removed with said cage sections in groups or said shoes may be removed individually after removal of said shoe retaining means.

106. In a thrust bearing, the combination of a thrust block, bearing members including a plurality of bearing shoes cooperating therewith, a housing providing an oil pot for said bearing members, means for tiltably supporting said bearing members and adapted to be assembled with said bearing members and thrust block exteriorly of said pot and moved axially as a unit into said pot, and means for retaining said bearing members and thrust block in unitary assembled relationship during said movement.

107. In a thrust bearing, the combination of a thrust block, bearing members including a plurality of bearing shoes cooperating therewith, a housing providing an oil pot for said bearing members, means for tiltably supporting said bearing members and adapted to be assembled with said bearing members and thrust block exteriorly of said pot and moved axially as a unit into said pot, means for retaining said bearing members and thrust block in unitary assembled relationship during said movement, and radial bearing members adapted to be mounted on said unit for movement therewith and in cooperating relation with said thrust block.

108. In a combined thrust and radial bearing, in combination with a thrust block, bearing members cooperating therewith, a base member for supporting said bearing members, means for optionally connecting said thrust block and said base member into a unit, and radial bearing members mounted on said last named means and cooperating with said thrust block.

HARRY A. S. HOWARTH.